United States Patent Office 3,741,723
Patented June 26, 1973

3,741,723
TREATING KERATINIC FIBERS WITH POLY-SULFHYDRYLATED POLYMERS
Gregoire Kalopissis, Paris, France, assignor to L'Oreal, Paris, France
No Drawing. Continuation-in-part of application Ser. No. 633,372, Apr. 25, 1967, which is a continuation-in-part of abandoned application Ser. No. 565,371, July 15, 1966, which is a continuation-in-part of application Ser. No. 520,075, Jan. 12, 1966, which is a continuation-in-part of abandoned application Ser. No. 463,890, June 14, 1965, which is a continuation-in-part of application Ser. No. 463,953, June 14, 1965, which in turn is a continuation-in-part of abandoned application Ser. No. 267,851, Mar. 25, 1963. This application Feb. 4, 1971, Ser. No. 112,759
Int. Cl. D06m 3/10
U.S. Cl. 8—127.51          8 Claims

ABSTRACT OF THE DISCLOSURE

A process of treating keratinic fibers with polysulfhydrylated polymers to improve the mechanical properties of said fibers and polysulfhydrylated polymer compositions used in said treatment.

---

This application is a continuation-in-part of my earlier application Ser. No. 633,372, filed Apr. 25, 1967, now abandoned, which in turn is a continuation-in-part of my applications Ser. No. 565,371 filed July 15, 1966, now abandoned, Ser. No. 520,075, filed Jan. 12, 1966, now abandoned, Ser. No. 463,953, filed June 14, 1965, now U.S. Patent 3,477,820, Ser. No. 463,890, filed June 14, 1965, now abandoned, Ser. No. 267,851, filed Mar. 25, 1963, now abandoned.

The use of the lower thiols, especially mercaptocarboxylic acids, such as thioglycolic or thiolactic acid, for the treatment of keratinic fibers is well known. When these thiols react with the —S—S— linkages of the keratin they transform themselves into the corresponding disulfides, which are of small molecular dimensions and soluble in water, and easily eliminated during washing of the fiber. Thus they have no physical effect on the original keratin.

It has now been found that if polymers which are soluble in water, alcohol or some other organic solvent, such as acetone, dimethylformamide, pyridine, etc., and contain sulfhydryl groups in their molecular chains, that is to say polysulfhydrylated polymers, are used instead of low molecular weight thiols, the polydisulfides formed, either by oxidation due to the action of an outside agent or by oxidation inherent in the process of reacting with the keratin, become insoluble in water or said other solvent. The reaction of the polysulfhydrylated polymers on the keratin fiber is accompanied by a supplemental deposit of polymeric coating material on the fiber. This decrease in solubility which accompanies the reaction of the polysulfhydrylated polymers on the fibers presents certain advantages, namely: the improvement of the mechanical properties of the treated fibers, the possibility of keeping a fiber in a selected position, after it has been subjected to the chemical action of the polysulfhydrylated polymers in question, etc. In other words, when keratinic fibers are treated with polysulfhydrylated polymers, there is a conjoint chemical and physical action and fibers having improved mechanical properties are usually obtained.

The present invention relates to a new composition for the treatment of keratinic fibers, characterized by the fact that it comprises polymers of medium molecular weight, the component chains of which comprise thiol groups.

The invention is also directed to a process of treating keratinic fibers, characterized by the fact that the fibers are impregnated by the hereinbefore described compositions.

The process of treating keratinic fibers according to the invention results in imparting both improved mechanical properties and permanent deformation to these fibers, and in connection with the latter has important advantages which will be hereinafter set forth.

In general these polymers may be obtained by starting with previously prepared polymers having in their chains functional reactive groups which are sufficient to permit a thiol group to be introduced in the usual known manner.

The present invention is thus related to a composition and method for treating keratinic fiber, especially human hair, using said composition which comprises impregnating the fiber or human hair with a solution of a polysulfhydrylated polymer and a solvent therefor, said solvent being selected from the group consisting of water, alcohol and their mixtures and said polymer being selected from the group consisting of:

(a) A polysulfhydrylated polymer having recurring units of the formula:

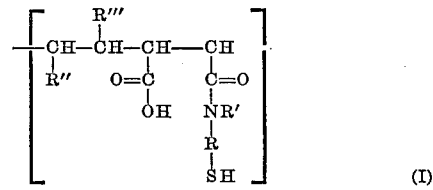

wherein R″ is selected from the group consisting of hydrogen and phenyl, R‴ is hydrogen, R is selected from the group consisting of alkylene having 2–4 carbon atoms and alkylene having 2–4 carbon atoms substituted with a member selected from the group consisting of carboxy and carbalkoxy and R′ is selected from the group consisting of hydrogen, methyl and ethyl, (b) A polysulfhydrylated polymer having recurring units of the formula:

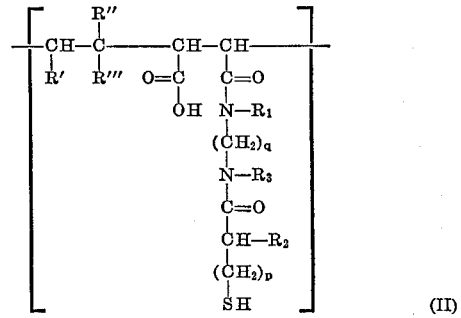

wherein $R_1$ is selected from the group consisting of hydrogen, methyl, ethyl and —CH$_2$—CH$_2$—OH, $R_2$ is selected from the group consisting of hydrogen and methyl, $R_3$ is hydrogen, $q$ is 2–6 inclusive, $p$ is 0 or 1, R′ and R″ are selected from the group consisting of hydrogen, lower alkyl having 1–4 carbon atoms, phenyl and lower alkoxy having 1–4 carbon atoms, and R‴ is selected from the group consisting of hydrogen,

(c) A polysulfhydrylated polymer having recurring units of the formula:

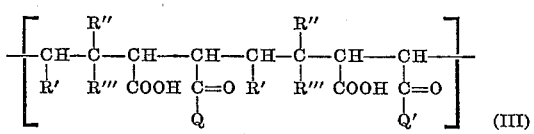

wherein R′ and R″ are selected from the group consisting of hydrogen, lower alkyl having 1–4 carbon atoms, phenyl and lower alkoxy having 1–4 carbon atoms, R'''
is selected from the group consisting of hydrogen,

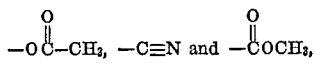

Q has the formula

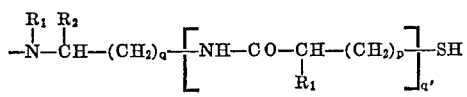

wherein $R_1$ is selected from the group consisting of hydrogen and methyl, $R_2$ is selected from the group consisting of hydrogen and —COOH, $q$ is 1–5 inclusive, $q'$ is equal to 0 or 1 and $p$ is equal to 0 or 1, and Q' has the formula

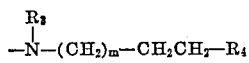

wherein $R_3$ is selected from the group consisting of hydrogen and lower alkyl having 1–4 carbon atoms, $R_4$ is selected from the group consisting of lower alkyl having 1–4 carbon atoms, —O—$(CH_2)_2$OH when $m$ is 0 and

wherein $r$ and $r'$ are selected from the group consisting of lower alkyl having 1–4 carbon atoms and together with the nitrogen atom to which they are attached form a ring selected from the group consisting of morpholinyl and piperidinyl and $m$ is 0–4, (d) A polysulfhydrylated polymer having recurring units of the formula:

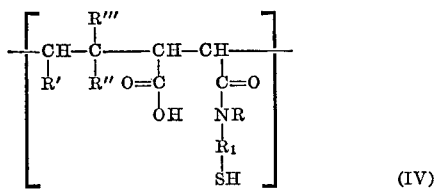

wherein $R_1$ is selected from the group consisting of alkylene having 2–4 carbon atoms and alkylene having 2–4 carbon atoms substituted with a member selected from the group consisting of carboxy and carbalkoxy, R is selected from the group consisting of hydrogen, methyl and ethyl, R' and R'' are selected from the group consisting of hydrogen, lower alkyl having 1–4 carbon atoms, phenyl and lower alkoxy having 1–4 carbon atoms and R''' is selected from the group consisting of hydrogen,

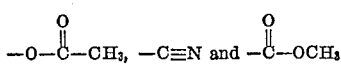

and (e) A polysulfhydrylated polymer (V) condensed from (1) an anhydride polymer selected from the group consisting of poly(acrylic anhydride), poly(itaconic anhydride), poly(mixed acrylic-methacrylic anhydride), polymethacrylic anhydride) and poly(maleic anhydride) and (2) a member selected from the group consisting of (i) an aminothiol having the formula HS—R—NH—R' wherein R is selected from the group consisting of alkylene having 2–4 carbon atoms and alkylene having 2–4 carbon atoms substituted with a member selected from the group consisting of alkyl having 1–4 carbon atoms, carboxy and carbalkoxy and R' is selected from the group consisting of hydrogen, methyl and ethyl, (ii) a mercaptoamide having the formula

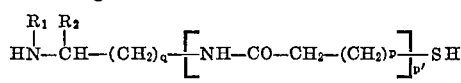

wherein $R_1$ is selected from the group consisting of hydrogen, methyl, ethyl and —$CH_2$—$CH_2$—OH, $R_2$ is selected from the group consisting of hydrogen and —COOH, $q$ is 1–5 inclusive, $q'$ is equal to 1 and $p$ is equal to 0 or 1, and optionally (3) with an amine selected from the group consisting of an amine having the formula

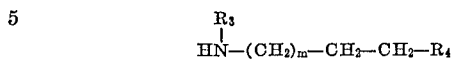

wherein $R_3$, $R_4$ and m have the meanings given above, said solution containing 1–20 percent by weight of said polysulfhydrylated polymer and having a pH ranging from 4.5–10, and shaping said impregnated hair in the desired configuration.

In the above formulae for the polysulfhydrylated polymers, the number of recurring units can range between about 2–25 when an essentially or substantially water-soluble polymer is desired. The number of such units can be higher, of course, when solvents other than water are desirable or contemplated.

Among these polymers particularly suited for use as points of departure for the preparation of polysulfhydrylated polymers to be used according to the invention are the polymers comprising ab initio as a reagent group, the following

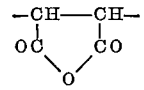

As is well known, this group is present in those polymers which are produced by the copolymerization of maleic anhydride with a copolymerizable monomer, that is to say, one having an active double linkage.

Illustrative examples of polymers which may be used as points of departure when preparing the polysulfhydrylated polymers according to the invention include:

(a) the copolymers of an aliphatic or aromatic vinylic ether and maleic anhydride, and particularly the copolymers of vinyl-methylether, vinylethylether, or vinylphenylether and maleic anhydride;

(b) the copolymers of an aromatic vinylic composition and maleic anhydride, and particularly the copolymers of styrene or its homologs and maleic anhydride and (c) the copolymers of a monoolefine and maleic anhydride, and particularly the copolymers of ethylene and maleic anhydride.

Since it is most desirable to have the maximum number of reactive groups,

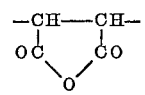

in the molecule of the copolymer used in order to permit the introduction of the largest possible number of thiols, those copolymers in which the ratio between the maleic anhydride and the monomer of the type described (having two active bonds) approaches unity are preferred.

The degree of polymerization $n$ of the different polymers used may vary within wide limits and this is a factor which must be taken into account, depending upon the family of polymers employed.

In effect, the choice of the degree of polymerization $n$ depends on the one hand on the ability of the polymer under consideration to penetrate into the fiber, and on the other hand, on the need for utilizing polymers which are soluble in a selected solvent, such as water at a basic pH, on the permeability of the fiber to be treated, and the conditions of application (temperature, etc. . . . ). Thus, for example when a styrene/maleic anhydride copolymer is to be dissolved in an aqueous basic pH solution, the degree of polymerization should not be greater than about 20.

It is evident that it is impossible to give exact values for all the solvent and polymer combinations envisaged in the present application, but if aqueous solutions are used, it may be used in a general way that the average molecular weight of the starting polymer used should be less than about 4000.

The introduction of the thiol group into the said polymers may be carried out advantageously by reaction with an aminothiol of the formula HS—R—NHR', in which R designates an alkylene radical comprising preferably from 2 to 4 carbon atoms, which may be substituted by alkyl radicals which may have up to 4 carbon atoms, a carboxyl group or a carbalkoxy group and R' represents hydrogen or an alkyl group such as $CH_3$, $C_2H_5$, etc.

Among the aminothiols which may be advantageously used in carrying out the present invention, the following may be listed:

β-mercaptoethylamine,
N-methyl-β-mercaptoethylamine,
cysteine,
ethylcysteinate, etc.

The reaction with respect to the reactive anhydride group takes place as follows to produce a polymer of the general type:

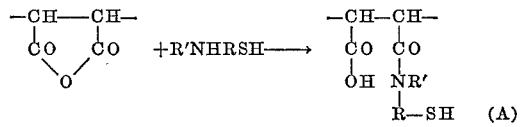

R and R' having the significance hereinbefore indicated. The polymers thus obtained have a free carboxy group in addition to the thiol group and are soluble in water if used in the form of their salts with alkaline metals, ammonia or amines.

In general the polymers of group I, useful in the present invention, are polysulfhydrylated polymers having recurring units of the formula:

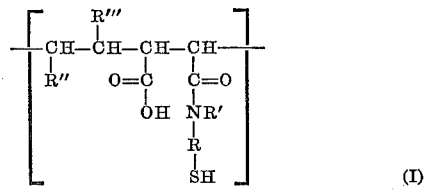

in which R" is selected from the group consisting of hydrogen and phenyl, R''' is hydrogen, R is selected from the group consisting of alkylene having 2–4 carbon atoms and alkylene having 2–4 carbon atoms substituted with a member selected from the group consisting of carboxy and carbalkoxy and R' is selected from the group consisting of hydrogen, methyl and ethyl. Preferably about 2–25 such units are present in the polymer, especially when a water-soluble polymer is desired. A number of units greater than 25, however, can be employed especially when a solvent other than water is desired.

The lower molecular weight polymers that are water-soluble in aqueous solutions having a pH above 7 are preferred for use in human hair treating cosmetic compositions. Higher molecular weight polymers that are soluble in stronger organic solvents can be used to treat other keratinic fibers, such as wool. Further, the solubility of these compounds is not limited to basic pH. It is preferred to use a pH above 4.5.

The following examples illustrate the preferred process of preparation of polymers of type I:

EXAMPLE 1

50.5 grams, or .25 gram molecule of the unit structure of styrene/maleic anhydride copolymer in which the number $n$ is equal to 8 (a copolymer commercially known as resin SMA 1000 A of the Texas Butadiene Chemical Corp.) are dissolved in 200 cc. of anhydrous acetone. This product is stated to have a styrene monomer/maleic anhydride ratio of 1:10.9. 0.225 gram molecule of β-mercaptoethylamine hydrochloride is added to this solution at room temperature under a nitrogen atmosphere. 0.225 gram molecule of triethylamine in solution in 50 cc. of acetone is then added slowly, while keeping the temperature between 15 and 20° C. The mixture is then boiled for three hours. The triethylamine hydrochloride formed in this manner is drained after cooling and washed with a little acetone.

The acetonic filtrate is evaporated until dry under a sub-atmospheric pressure and a nitrogen atmosphere. The residue obtained is purified by dissolving it in a 10% solution of sodium hydroxide and reprecipitating it, after drying, by means of a dilute solution of hydrochloric acid; this yields 60 grams of the desired sulfhydryl polymer in the form of a white powder which is then vacuum dried.

Analysis

The product thus obtained was subjected to the following tests: (The sulfhydryl group is calculated on the basis of a styrene monomer/maleic anhydride ratio of 1:10.9).

Determination of sulfhydryl group content (a) SH percent calculated: 10.62. SH percent found: 5.07.

(b) SH after reduction of the oxidized form eventually present in the product

SH percent calculated: 10.62. SH percent found 6.25.

It clearly follows from these tests that the polymer obtained has a large part of its sulfhydryl groups in the free state.

EXAMPLE 2

20.3 g. or 0.1 gram molecule of the unit structure of maleic anhydride/styrene copolymer in which the number $n$ is equal to 4 (commercially known as resin SMA 400 A of the Texas Butadiene Chemical Corporation), are dissolved in 200 cc. of anhydrous acetone. A preliminary acidimetric testing of this product indicates that the anhydride group is present in a proportion of only 84%.

0.84 gram molecule of β-mercaptoethylamine hydrochloride is added to this solution, and while agitating it under a nitrogen atmosphere an acetonic solution of 0.84 gram molecule of triethylamine is added drop by drop, while keeping the temperature at 15–20° C. After this addition, the mixture is brought to reflux for two hours, and the triethylamine hydrochlorate deposited is then dried. The acetonic filtrate is evaporated until dry in a nitrogen atmosphere under sub-atmospheric pressure. The residue obtained is purified by dissolving it in a 10% solution of sodium hydroxide and reprecipitating it after drying with a dilute solution of hydrochloric acid. This yields 18 grams of the desired sulfhydrylated polymer in the form of a white powder, which is then vacuum-dried.

Analysis

The product thus obtained was subjected to the following tests. (The sulfhydryl group is calculated on the basis of a styrene/maleic anhydride ratio of 1:0.84.)

Determination of sulfhydryl group (a) SH percent calculated: 9.92. SH percent found: 4.13.

(b) SH after reduction of the oxidized form eventually present in the product.

SH percent calculated: 9.92. SH percent found: 5.07.

EXAMPLE 3

20.2 grams, 0.1 gram molecule of the unit structure of the maleic anhydride/styrene copolymer, in which the number $n$ is equal to 8 (a copolymer which is commercially known as resin SMA 1000 A of the Texas Butadiene Chemical Corporation) are dissolved in 150 ml. of anhydrous acetone. This product is given as having a styrene monomer/maleic anhydride ratio of 1:0.9. 0.9 gram molecule of cysteine hydrochloride is added to this solution at room temperature and under a nitrogen atmosphere. Then 0.9 gram molecule of triethylamine in solution in 50 cc. of acetone is added slowly, while keeping the temperature between 15 and 20° C. and the mixture is then boiled for three hours. The triethylamine hydrochloride thus obtained is drained after cooling, and washed with a little acetone.

The acetonic filtrate is evaporated until dry under a nitrogen atmosphere at a sub-atmospheric pressure. The residue thus obtained is purified by dissolving it in a 10% solution of sodium hydroxide and reprecipitating it, after drying, by means of a dilute solution of hydrochloric acid. 24 g. of the desired polymer are thus obtained in the form of a white powder, which is then vacuum dried.

Analysis

The product thus obtained is subjected to the following tests: (The sulfhydryl group is calculated on the basis of styrene monomer/maleic anhydride ratio of 1:0.9.)

Determination of sulfhydryl group content (a) SH percent calculated: 9.57. SH percent found: 2.5.

(b SH after reduction )of the oxidized form eventually present in the product.

SH percent calculated: 9.57. SH percent found: 2.61.

EXAMPLE 4

There is used in this preparation the maleic anhydride/ styrene copolymer having a molecular weight of about 3000, obtained by copolymerization of styrene with maleic anhydride, in equimolecular proportions, and in the presence of benzoyl peroxide as an activator and normal butyl mercaptan as a regulator, in a conventional manner, by heating to 70–72° C. for 5 hours.

Acidimetric analysis of the product indicates that the anhydride group is present in the proportion of 74%.

15 grams, or 0.074 gram-molecule of the unit structure of this copolymer are dissolved in 150 cc. of acetone and 0.148 gram molecule of β-mercaptoethylamine hydrochloride is added to it at room temperature under a nitrogen atmosphere. 0.148 gram molecule of triethylamine in solution in 50 cc. of acetone is then added slowly, while stirring and keeping the temperature between 15 and 20° C. The mixture is boiled for three hours and evaporated until dry under a nitrogen atmosphere and sub-atmospheric pressure. The residue thus obtained is purified by dissolving it in a 10% solution of sodium hydroxide and reprecipitating it by means of a dilute solution of hydrochloric acid. 16 grams of the desired polymer are obtained in the form of a white powder, which is vacuum dried.

Analysis

The product thus obtained is subjected to the following tests. (The sulfhydryl group is calculated on the basis of a styrene monomer/maleic anhydride ratio of 1:0.74.)

Determination of sulfhydryl group (a) SH percent calculated: 8.76. SH percent found: 4.1.

(b) SH after reduction of the oxidized form eventually present in the product.

SH percent calculated: 8.76. SH percent found: 5.65.

It follows clearly from these tests that the polymer obtained has a very high proportion of sulfhydryl groups in the free state.

EXAMPLE 5

6.5 grams of sodium hydroxide, or 0.16 gram-molecule are dissolved in 60 ml. of water. Temperature is brought to 20° C. and 19 grams of β-mercaptoethylamine hydrochloride (0.168 gram-molecules) are added. Temperature is maintained at 20° C. and 12.6 grams of the maleic anhydride/ethylene copolymer (known as resin DX–840–11 of the Monsanto Company, Massachusetts), are added by small quantities. For this product (DX 840-11), the ethylene monomer/maleic anhydride ratio is 1:0.81.

The addition being completed, 25 ml. of 40% sodium hydroxide are added and precipitation of the polysulfhydrylated polymer is effected by acidification with a concentrated solution of hydrochloric acid.

If desired, an extra purification of the product can be effected by dissolving it again in an alkaline solution (sodium hydroxide) and reprecipitating it in an aqueous solution of hydrochloric acid. A resilient body is thus obtained which is dried under vacuum. Yield: 75%.

Analysis

The product thus obtained is subjected to the following tests: (The sulfhydryl group is calculated on the basis of an ethylene monomer/maleic anhydride ratio of 1:0.81).

Determination of sulfhydryl group (a) SH percent calculated: 14.25. SH percent found: 8.75.

(b) SH after reduction of the oxidized form eventually present in the product—SH percent calculated: 14.25. SH percent found: 9.5.

The properties of resistance to deformation conferred upon fibers by treatment with the solution of polysulfhydryl polymers according to the invention are of value in both the cosmetic field and the textile field, for example, that of wool.

The polysulfhydrylated polymer compositions are particularly valuable when used for the permanent waving of keratinic fibers. In effect, in this case, fixation by means of oxidizing agents is unnecessary. As indicated above, the polysulfhydrylated polymers are capable of transformation either at the moment at which they reduce the K—S—S—K residues of the keratin, or by oxidation in the air, into relatively insoluble reticulated disulfides, and their molecular weight is at least doubled. The deposit of polydisulfide polymers in and on the fiber forms a solid coating which is sufficient to keep it in its new position for a sufficiently long time to permit the oxygen of the air to complete the reconstitution of the K—S—H into K—S—S—K.

The concentration of the polysulfhydrylated polymers in the compositions for the treatment of keratinic fibers, according to the invention, is preferably between 1 and 20%.

Several examples of the application of the polysulfhydrylated polymers according to the invention will now be described:

EXAMPLES OF APPLICATION—EXAMPLE 6

A solution having the following composition is prepared:

|   | G. |
|---|---|
| Polymer resulting from the reaction of β-mercaptoethylamine with the copolymer of styrene and maleic anhydride obtained as in Example 1 | 20 |
| Urea | 5 |

Ammonia q.s.p., pH 9.8–9.9.
Water q.s.p. 100 cc.

The hair is impregnated with this solution and rolled up on curlers in the conventional manner employed for permanent waving.

Each lock of hair is saturated with said solution. After leaving this solution in contact with the hair for from 10 to 15 minutes, it is carefully rinsed with warm water and fixed with a 1.8% solution of hydrogen peroxide. After five minutes of contact with this oxidizing solution, the hair is again copiously rinsed. This process yields permanently waved hair having excellent stability against both humidity and the passage of time.

EXAMPLE 7

The hair is impregnated with the same solution as the one described in Example 6 and under the same conditions in order to permanently wave it, except that no oxidizing solution is applied. After the period of contact, it is sufficient to copiously rinse the hair for at least two minutes with warm water. This yields a permanent wave which is of good quality and long lasting.

EXAMPLE 8

The alkaline solution of the polymer described in Example 1 and hereinafter described also yields excellent results when used for warm permanent waves. For this purpose the operator applies to each curler conventional means used to heat them to a temperature between 65 and 90° C. This produces, after unrolling and without any application of oxidizing lotion, a very pronounced and durable permanent wave.

EXAMPLE 9

A solution having the following composition is prepared:

|  | G. |
|---|---|
| Polymer resulting from the reaction of β-mercaptoethylamine with the copolymer of styrene and maleic anhydride obtained as in Example 2 | 15 |
| Ammonia q.s.p., pH 9.8. | |
| Water q.s.p. 100 cc. | |

This solution is applied to the hair in the manner described in Examples 6 and 7 and the result is a permanent wave of very good quality.

EXAMPLE 10

The hair is impregnated with either the solution described in Example 6 or that of Example 9 and a conventional permanent waving process is then carried out. This results in a permanent deformation of the hair which imparts to the resulting "wave" an appearance and durability substantially superior to those obtained by conventional means. In the course of this waving operation, which comprises the steps of moistening, rolling on curlers, and drying, the excess ammonia evaporates.

A portion of the polydisulfides which have been formed remain on the fibers, thus imparting to the hair the properties hereinbefore described, by a method which is very easy to carry out.

EXAMPLE 11

A solution as follows is prepared:

|  | G. |
|---|---|
| Polymer resulting from the reaction of β-mercaptoethylamine with the ethylene/maleic anhydride copolymer obtained as per Example 5 | 16 |
| Urea | 5 |
| Ammonia q.s.p., pH 9.7. | |
| H₂O q.s.p. 100 cc. | |

The hair is impregnated with this solution and is rolled up on curlers utilizing the conventional process for permanent waving.

Every curl is saturated with the above solution and thoroughly rinsed after a time of contact between 10 and 15 minutes. A permanent deformation of hair is thus obtained, possessing a good stability towards both humidity and the passage of time.

Turning now to the polymers identified as type II, they are essentially polysulfhydrylated polymers having recurring units of the formula

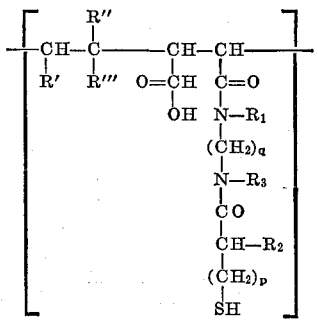

(II)

in which:

$R_1$ is selected from the group consisting of hydrogen, methyl, ethyl and $-CH_2-CH_2-OH$;

$R_2$ is selected from the group consisting of hydrogen and methyl;

$R_3$ is hydrogen;

$q$ is an integer from 2 to 6 inclusive;

$p$ is 0 to 1;

R' and R'' are selected from the group consisting of hydrogen, lower alkyl having 1–4 carbon atoms, phenyl and lower alkoxy having 1–4 carbon atoms, and R''' is selected from the group consisting of hydrogen, $-O-CO-CH_3$, $-C\equiv N$ and $-CO-O-CH_3$.

Polysulfhydryl polymers of type II of particular interest, especially for treating human hair, are those whose molecular weight is sufficiently low for the polymer to be soluble in alkaline aqueous medium. The polymers in such alkaline solution can become attached, by way of their —SH groupings, to the hair by which means they can be used to impart "permanent" waves to the hair. However, other solvents and acid pH ranges may be used to treat other keratinic fibers.

The polysulfhydryl polymers of type II can be prepared by a process in which a starting polymer having a recurring structural unit of the formula:

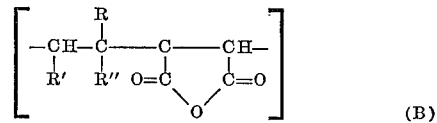

(B)

is condensed with a mercapto-amide amine of the formula:

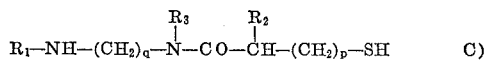

C)

where R', R'', R''', $R_1$, $R_2$, $R_3$, $p$ and $q$ have the meanings given above. This condensation readily takes place in aqueous solution and at temperatures in the neighborhood of the ambient temperature merely by bringing into contact the desired quantities of mercapto-amide amine and starting polymer. In the course of the condensation, it may be desirable to neutralize the carboxylic function which forms by adding a base such as sodium hydroxide. The condensation yields are generally very good and the desired polysulfhydryl polymer may be isolated by simple precipitation in acid medium.

It is preferred, though not essential, to carry out the condensation by using the mercapto-amide amine in a stoichiometric proportion to the anhydride function of the starting polymer. This results in a high number of SH groups on the polysulfhydryl polymer formed.

The mercapto-amide amines corresponding to the Formula C above are new compounds and as such, the process for the preparation of the said mercapto-amide amines, in which a lower alkyl ester, for instance the methyl or ethyl ester, of a mercapto-carboxylic acid of the formula:

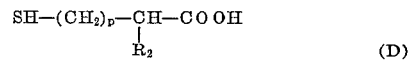

(D)

is condensed with a lower aliphatic diamine of the formula:

$$R_1-NH-(CH_2)_q-NH-R_3 \quad (E)$$

in which $R_1$, $R_2$, $R_3$, $p$ and $q$ have the meanings given above which will be described in detail.

Suitable mercapto-carboxylic acids whose esters can be used in this process are, for instance, thioglycolic, thiolactic, and β-mercaptopropionic acids; and suitable diamines are, for instance, ethylenediamine, trimethylenediamine and hydroxyethylenediamine.

Since mercapto-carboxylic acids and diamines suitable for use as starting materials for the preparation of the mercaptoamide amines are inexpensive substances, as are the starting polymers, the polysulfhydryl polymers of the invention can be obtained at a cost which makes them economically competetive.

The type II polysulfhydryl which are of particular interest are those polymers in which R' and R'' each represent a hydrogen atom and in which R''' represents the radical —OCOCH$_3$, —C≡N, or —COOCH$_3$; and those in which R' repersents a hydrogen atom, R'' represents the radical —CH$_3$ and R''' represents the radical

—COOH$_3$

As starting polymer, there may be used those which result from the copolymerization of maleic anhydride with a monomer possessing an active double bond, and in particular:

(a) copolymers of an aliphatic or aromatic vinyl ether and maleic anhydride, suitable vinyl ethers being, for instance vinylmethylether, vinylethylether and divinylphenylether;

(b) copolymers of an aromatic vinyl compound and maleic anhydride, for instance copolymers of styrene (or its homologues) and maleic anhydride and (c) copolymers of a monoolefin and maleic anhydride, for instance copolymers of ethylene and maleic anhydride.

It is desirable, but not essential, to use copolymers in which the proportion of maleic anhydride to the monomers having an active double bond is close to unity.

The present invention also concerns compositions and a method for treating keratinic fibers and especially a method for treating hair, in which the hair is preferably impregnated with an aqueous alkaline solution of the polysulfhydryl polymer of type II, the hair is constrained to the desired shape and any undesired excess of said polymer is removed, whereby it is possible to obtain a permanent deformation of the hair thus treated. If desired the hair after said impregnation can be rinsed and treated with a hair-treatment oxidizing agent, for instance hydrogen peroxide.

These polysulfhydryl polymers may also be employed to impregnate keratinic textile fibers such as wool, which may thereafter be dyed with direct dyes.

This portion of the invention is illustrated by the following examples.

EXAMPLE 12

Preparation of N-(β-aminoethyl)thioglycolamide

This compound, which has the formula

HS—CH$_2$—CONH—CH$_2$—CH$_2$—NH$_2$ is obtained in the following manner:

64 g. (1 g. mol.) of ethylene diamine (96%) are introduced into a round-bottomed flask provided with a stirrer, a reflux condenser, a thermometer, a dropping funnel and a nitrogen supply tube.

126 g. (1 g.-mol.) of ethylthioglycolate (95%) in solution in 100 cc. of absolute alcohol are introduced drop-by-drop with stirring, the temperature being maintained at about 40–45° C., whereafter heating is carried out under reflux for 20 minutes.

The product precipitates on cooling, whereafter it is separated and dried, and there are obtained 107 g. of N-(β-aminoethyl)thioglycolamide, which corresponds to a yield of about 80%.

This compound takes the form of a white crystalline powder having a melting point of 133° C. and a purity of 99%.

EXAMPLE 13

This example describes the preparation of the polymer having a recurring structural unit of the Formula II, where:

R', R'', R''', R$_1$ and R$_2$ are all hydrogen, $p=0$ and $q=2$.

134 g. (1 g.-mol) of N-(β-aminoethyl)thioglycolamide, prepared as indicated in Example 12, and 600 cc. of water are introduced into a 3 litre round-bottomed flask provided with a stirrer, a thermometer and a nitrogen supply tube.

There are added with stirring and cooling 71.5 g. (0.5 g.-mol) of the ethylene/maleic anhydride copolymer sold under the trade name "Resine D X 840–11" by the Monsanto Chemical Company. The specific viscosity of this copolymer, determined as a 1% solution in dimethylformamide at a temperature of 25° C., is 0.1. By titration, the ethylene/maleic anhydride ratio of this resin was found to be 1:0.88.

Then, to liberate the amine function salifying the carboxyl group of the copolymer there are added in small portions to the reaction mixture 20 g. (0.5 g.-mol) of sodium hydroxide in tablet form, whereafter a further addition of 71.5 g. of ethylene/maleic anhydride copolymer is made, following the above indicated procedure, and 20 g. of sodium hydroxide in tablet form are again added in small fractions.

At the end of 2 hours, the reaction is complete and the product is acidified with concentrated hydrochloric acid in order to precipitate the desired product, which is washed a number of times with water and is dried in vacuo.

There are thus obtained 247 g. of polymer, which corresponds to a yield of about 90%. After drying, this polymer becomes a spongy friable mass.

Analysis

By calculating the sulfhydryl groups on the basis of the ethylene/maleic anhydride ratio of 1:0.88, which has been indicated above, the product thus obtained was subjected to the following checks:

By determining the sulfhydryl groups by titration of the mercaptide into which the polymer is converted by the action of a solution of methyl iodide and an excess of mercury, there were found:

Free SH percent (calculated): 11.9. Free SH percent (found): 7.55.

The extent of conversion seems to be 63%.

In order to check whether the difference between the percentage of SH calculated and the percentage of SH found is partly due to an oxidation which occurs during the condensation, the prepared polymer was subjected to a reduction of any —S—S— bonds present by means of sulphitolysis and determination of the new SH groupings formed. In this way, there are found:

SH percent (calculated): 11.9. SH percent (found): 9.55.

This new determination indicates that the extent of conversion is in fact 80%.

It is therefore found that the polymer obtained does in fact possess a very large part of its sulfhydryl functions in the free state.

EXAMPLE 14

This example describes the preparation of the polysulfhydryl polymer having a recurring structural unit of the Formula II where R', R'', R$_1$, R$_2$ and R$_3$ are all hydrogen, R''' is the radical —O—CO—CH$_3$, $p=0$ and $q=2$.

N-(β-aminoethyl) thioglycolamide is condensed with a vinyl acetate/maleic anhydride copolymer, by the following procedure:

There is employed as starting material the vinyl acetate/maleic anhydride copolymer in known manner by copolymerization of equimolecular quantities of vinyl acetate and maleic anhydride in toluene, in the presence of benzoyl peroxide acting as catalyst. A 1% solution of the copolymer thus obtained in dimethylformamide has at 25° C. a specific viscosity of 0.17. By titration of the anhydride function, it was found that the mole ratio of vinyl acetate to maleic anhydride is equal to 0.93:1.

33.5 g. (0.25 g.-mol.) of N-(β-aminoethyl)-thioglycolamide and 250 cc. of water are introduced into a round-bottomed flask provided with a stirrer, a thermometer and a nitrogen supply tube. There are then added with stirring 22 g. (0.125 g. mol.) of the above defined vinyl acetate/maleic anhydride copolymer, followed by 12.5 cc. (0.125 g. mol.) of a 40% aqueous sodium hydroxide solution to liberate the amine which salified the carboxyl of the copolymer.

There are then simultaneously added 22 g. (0.125 g. mol.) of vinyl acetate/maleic anhydride copolymer and 12.5 cc. (0.125 g. mol.) of a 40% aqueous sodium hydroxide solution. When the reaction is complete, the product is acidified with concentrated hydrochloric acid, and the product which is precipitated is thereafter washed with water and then dried in vacuo.

In this way, 51.5 g. of polysulfhydryl polymer are obtained in a yield of 67%.

This polymer, which takes the form of a powder soluble in water having an alkaline pH after drying, was subjected to the following analytical determinations:

SH percent (calculated): 10.6. SH percent (found): 6.58.

After reduction of the oxidized part of the product, a further analytical determination was carried out, with the following results:

SH percent (calculated): 10.6. SH percent (found): 9.54.

EXAMPLE 15

This example describes the preparation of a polysulfhydryl polymer having a recurring structural unit of the Formula II, where R′, R‴, $R_1$, $R_2$ and $R_3$, are all hydrogen, R″ is phenyl, $p=0$ and $q=2$.

N-(β-aminoethyl)thioglycolamide is condensed with a styrene/maleic anhydride copolymer, under the same conditions as are described in Example 12, except that the starting copolymer was a styrene/maleic anhydride copolymer sold under the trade name "Resine SMA 1000 A" by Texas Butadiene, the number of said structural units having been determined as equal to 8 and the styrene/maleic anhydride mole ratio having been determined as 1.31:1.

There was thus obtained, in a yield of 86%, a white powder which is soluble in water in alkaline medium, on which the following analytical determinations were made:

SH percent (calculated): 8.95. SH percent (found): 5.6.

After reduction of the oxidized form of the product, there were found:

SH percent (calculated): 8.95. SH percent (found): 6.45.

EXAMPLE 16

This example describes the preparation of a polysulfhydryl polymer having a recurring structural unit of the Formula II, where R′, $R_1$, $R_2$ and $R_3$ are all hydrogen, R″ is methyl, R‴ is the radical —CO—O—$CH_3$, $p=0$ and $q=2$, by condensation of N-(β-aminoethyl)thioglycolamide with a methyl methacrylate/maleic anhydride copolymer, using the following procedure:

There is employed as starting material the methyl methacrylate/maleic anhydride copolymer obtained in known manner by copolymerization in toluene of equimolecular quantities of methyl methacrylate and maleic anhydride, in the presence of azo-bis-isobutyronitrile as catalyst. In 1% solution in dimethylformamide, the polymer thus obtained has a specific viscosity of 0.088 at a temperature of 25° C. The methyl methacrylate/maleic anhydride mole ratio was determined by titration of the anhydride function as equal to 1.52:1.

By using the conditions described in Example 12, there is obtained in a yield of 67% a white powder which is soluble in water and an alkaline pH.

The following analytical determinations were made on this powder:

SH percent (calculated): 8.6. SH percent (found): 3.24.

After reduction of the oxidized form of the product, a further determination was made, which gave:

SH percent (calculated): 8.6. SH percent (found): 6.1.

EXAMPLE 17

This example describes the preparation of a polysulfhydryl polymer having a recurring unit of Formula II, where R′, R″, $R_1$, $R_2$ and $R_3$ are all hydrogen, R‴ is the radical —CN, $p=0$ and $q=2$, by condensing N-(β-aminoethyl)thioglycolamide with an acrylonitrile/maleic anhydride copolymer, using the following procedure:

There is employed as starting material the acrylonitrile/maleic anhydride copolymer obtained in known manner by copolymerization in toluene of equimolecular quantities of acrylonitrile and maleic anhydride in the presence of benzoyl peroxide as catalyst. A 1% solution of this polymer in dimethylformamide has at a temperature of 25° C. a specific viscosity of 0.055. By treating the anhydride function of this polymer, the acrylonitrile/maleic anhydride mole ratio was determined as equal to 1.19:1. By using the conditions of Example 12, there is obtained in a yield of 41% a white powder which is soluble in water containing an alkaline medium, and to which the following analytical determinations applied:

SH percent (calculated): 11.2. SH percent (found): 6.5.

After reduction of the oxidized form of the product, a further determination was made, which gave:

SH percent (calculated): 11.2. SH percent (found): 9.37.

EXAMPLE 18

This example describes the preparation of a polysulfhydryl polymer having a recurring structural unit of Formula II, where R′, R″, $R_1$, $R_2$ and $R_3$ are all hydrogen, R‴ is the radical —CO—O—$CH_3$, $p=0$ and $q=2$, by condensation of N-(β-aminoethyl)thioglycolamide with a methyl acrylate/maleic anhydride copolymer, using the following procedure:

There is employed as starting material the methyl acrylate/maleic anhydride copolymer obtained in known manner by copolymerization in toluene of equimolecular quantities of methyl acrylate and maleic anhydride in the presence of benzoyl peroxide as catalyst. A 1% solution in dimethylformamide of the copolymer thus obtained has a specific viscosity of 0.093 at a temperature of 25° C. The methyl acrylate/maleic anhydride mole ratio of this copolymer was determined by titration of the anhydride function as equal to 0.9:1.

By using the conditions of Example 12, N-(β-aminoethyl)thioglycolamide is condensed with the above-defined methyl acrylate/maleic anhydride copolymer, and there is obtained in a yield of 71% a white powder soluble in water in alkaline medium, on which the following analytical determinations were made:

SH percent (calculated): 10.7. SH percent (found): 5.95.

After reduction of the oxidized form of the product, a further determination was made, which gave:

SH percent (calculated): 10.7. SH percent (found): 9.2.

EXAMPLE 19

This example describes the preparation of a polysulfhydryl polymer having a recurring structural unit of Formula II, where R′, R″, R‴, $R_1$, $R_2$ and $R_3$ are all hydrogen, $p=0$ and $q=6$, by condensation of N-aminohexylthioglycolamide with an ethylene/maleic anhydride copolymer, by the following procedure:

There are introduced into a round-bottomed flask provided with a stirrer, a thermometer and a nitrogen supply tube 206 g. (1 g.-mol) of N-aminohexylthioglycolamide prepared as indicated below in 1500 cc. of water. 71.5 g. (0.5 g.-mol) of the ethylene/maleic anhydride copolymer sold under the trade name "Resine DX 840–11" by the Monsanto Chemical Co. are then added with stirring and cooling. By titration of the anhydride function of this copolymer, its ethylene/maleic anhydride mole ratio was determined as equal to 1.6:1.

In order to liberate the amine which salifies the carboxyl of this copolymer, 50 cc. (0.5 g.-mol) of a 40% aqueous sodium hydroxide solution are added. Then, 71.5 g. (0.5 g.-mol) of the copolymer DX 840–11 and 50 cc. (0.5 g.-mol) of a 40% aqueous sodium hydroxide solution are simultaneously added. After the reaction, the product is acidified with concentrated hydrochloric acid.

The precipitated product is then washed with water and dried, whereby it is possible to obtain a yield of 80% i.e. 268 g. of a white powder soluble in water at an alkaline pH, from which the following analytical determinations were obtained:

SH percent (calculated): 9.8. SH percent (found): 6.1.

After reduction of the oxidized form of the product, a further determination was made, which gave the following results:

SH percent (calculated): 9.8. SH percent (found): 8.05.

The N-aminohexylthioglycolamide, a compound of the formula:

$$HS-CH_2-CONH-(CH_2)_6-NH_2$$

used in this example had been obtained by placing 43.6 g. (0.375 g.-mol) of 99% hexamethylenediamine in solution in 50 cc. of dioxan in a round bottomed flask provided with a stirrer, a reflux condenser, a thermometer, a dropping funnel and a nitrogen supply tube. 45 g. (0.375 g.-mol) of 99% ethyl thioglycolate are then introduced drop-by-drop with stirring, the temperature being maintained between 35° and 45° C. It is observed that a precipitate forms before the end of the introduction of the latter product, and when the reaction is complete, the product is cooled, and an abundant precipitate is obtained, which is thereafter separated and dried.

The product which is obtained in a yield of 66% takes the form of a white crystalline powder which melts at 122° C. and which has a purity of 92%.

Since this compound is unstable, it must be redissolved in water and immediately used.

EXAMPLE 20

This example describe the preparation of a polysulfhydryl polymer having a recurring structural unit of Formula II, where: R', R'', R''', $R_1$ and $R_3$ are all hydrogen, $R_2$ is methyl, $p=0$ and $q=2$, by condensation of N-(β-aminoethyl)thiolactamide with an ethylene/maleic anhydride copolymer, by the following procedure:

N-(β-aminoethyl)triolactamide is condensed with the ethylene/maleic anhydride polymer under the same conditions as have been described in the preceding example. There is thus obtained in a yield of 65% a white powder soluble in water in alkaline medium, on which the following analytical determinations were made:

SH percent (calculated): 10.8. SH percent (found): 7.0.

After reduction of the oxidized form of the product, a further determination was made, which gave the following results:

SH percent (calculated): 10.8. SH percent (found): 9.5.

The N-(β-aminoethyl)thiolactamide of the formula:

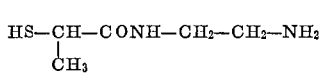

used in this example had been obtained by introducing 12.5 g. (0.2 g.-mol) of 95% ethylenediamine into a spherical flask provided with a stirrer, a thermometer, a dropping funnel and a nitrogen supply tube. The temperature of this round-bottomed flask is then brought to 80° C., whereafter there are added drop-by-drop with stirring 32.4 g. (0.2 g. mol.) of 100% butyl thiolactate in solution in 20 cc. of ethanol. When this addition is complete, the temperature is maintained at 85/90° C. for a further hour.

After cooling, the precipitate formed is separated, and after drying this precipitate takes the form of a white crystalline powder melting at 112/114° C. and having a purity of 85%. The yield is 64%.

The compound thus obtained is fairly stable and it need not be used immediately after its preparation.

EXAMPLE 21

This example describes the preparation of a polysulfhydryl polymer having a recurring structural unit of the Formula II, where R', R'', R''', $R_2$ and $R_3$ are all hydrogen, $R_1$ is the radical $-CH_2-CH_2-OH$, $p=0$ and $q=2$, by condensing N-(hydroxyethylaminoethyl)-thioglycolamide with an ethylene/maleic anhydride polymer, by the following procedure:

Using the conditions described in Example 19, N-(hydroxyethylaminoethyl) thioglycolamide obtained as indicated below is condensed with the ethylene/maleic anhydride copolymer. In this way, there is obtained in a yield of 58% a white powder soluble in water in alkaline medium, which was subjected to the following analytical determinations:

SH percent (calculated): 10.3. SH percent (found): 3.8.

After reduction of the oxidized form of the product a further determination was made, which gave the following results:

SH percent (calculated): 10.3. SH percent (found): 7.6.

The N-(hydroxyethylaminoethyl)thioglycolamide of the formula:

$$HS-CH_2-CONH-CH_2-CH_2-NHCH_2-CH_2-OH$$

used in this example has been obtained by introducing 26 g. (0.25 g.-mol.) of N-(hydroxyethyl)ethylenediamine and 20 cc. of water into a round-bottomed flask provided with a stirrer, a thermometer, a dropping funnel and a nitrogen supply tube. 30 g. (0.25 g.-mol.) of 99% ethyl thioglycolate are thereafter introduced drop-by-drop at ambient temperature with stirring, and the mixture is left in for five days at ambient temperature, with periodical stirring.

The product obtained which cannot be isolated, was directly titrated in the solution, from which an extent of reaction of 100% was determined.

EXAMPLE 22

This example describes the preparation of a polysulfhydryl polymer having a recurring structural unit of Formula II, where R', R'', R''', $R_2$ and $R_3$ are all hydrogen, $R_1$ is an ethyl radical, $p=0$ and $q=3$, by condensing N-(ethylaminopropyl)thioglycolamide with the ethylene/maleic anhydride copolymer, by the following procedure:

Using the condition described in Example 19, N-(ethylaminopropyl)thioglycolamide is condensed with the ethylene/maleic anhydride copolymer, whereby it is possible to obtain in a yield of 47% a white powder soluble in water in alkaline medium.

The polymer thus obtained was subjected to the following analytical determinations:

SH percent (calculated): 9.6. SH percent (found): 5.0.

After reduction of the oxidized form of the product, a further determination was made, which gave the following results:

SH percent (calculated): 9.06.
SH percent (found): 7.2.

The N-(ethylaminopropyl)thioglycolamide of the formula:

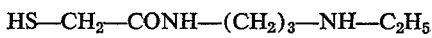
$$HS-CH_2-CONH-(CH_2)_3-NH-C_2H_5$$

used in this example has been obtained by introducing 20.4 g. (0.2 g.-mol.) of N-(ethylaminopropyl)amine into a round-bottomed flask provided with a stirrer, a thermometer, a dropping funnel and a nitrogen supply tube. The temperature of the flask is then brought to 45° C. and there are introduced drop-by-drop with stirring 24 g. (0.2 g.-mol.) of ethyl thioglycolate (99%) in solution in 20 cc. of ethyl alcohol. When the addition is complete, the product is refluxed for several minutes.

After cooling, the precipitate obtained is separated and dried. This product, which is obtained in a yield of 60%, takes the form of a white crystalline powder melting at 92/93° C., which has a purity of 100%.

The compound obtained is unstable and must be rapidly redissolved in order to be immediately used.

EXAMPLE 23

For effecting permanent hair waving, there is prepared a solution having the following composition:

| | G. |
|---|---|
| Product resulting from the action of N-($\beta$-aminoethyl)thioglycolamide on the ethylene/maleic anhydride copolymer obtained in accordance with Example 13 | 14 |
| Urea | 10 |
| Ammonia (20%) q.s. for pH 9.8. | |
| Water q.s. for 100 cc. | |

The hair is impregnated with this solution and wound on to curlers by the usual method adopted in permanent waving. After a period of contact of the order of 20 minutes, it is carefully rinsed in hot water and the so-called "setting" phase is proceeded with, using a hydrogen peroxide solution (6 vol.). After contact for 5 minutes with this oxidizing solution, the hair is again abundantly rinsed. There is obtained a permanent deformation of the hair, which has good stability to moisture.

EXAMPLE 24

For carrying out a permanent wave in accordance with the invention, there is prepared a solution having the following composition:

| | G. |
|---|---|
| Product resulting from the action of N-($\beta$-aminoethyl)thioglycolamide on a vinyl acetate/maleic anhydride copolymer obtained in accordance with Example 14 | 10 |
| Urea | 9 |
| Ammonia (20%) q.s. for pH 9.8. | |
| Water q.s. for 100 g. | |

This solution is applied to hair using the procedure described in Example 23. There is thus obtained a permanent hair wave having good stability to moisture.

EXAMPLE 25

For treating the hair in accordance with the invention, there is prepared a solution having the following composition:

| | G. |
|---|---|
| Product resulting from the action of N-($\beta$-aminoethyl)thioglycolamide on a styrene/maleic anhydride copolymer obtained in acordance with Example 15 | 12 |
| Urea | 8 |
| 20% ammonia q.s. for pH 9.5. | |
| Water q.s. for 100 g. | |

This solution is applied to hair using the procedure described in Example 23. There is thus obtained a permanent deformation of the hair having excellent stability to moisture.

EXAMPLE 26

For treating the hair in accordance with the invention, it is impregnated with a solution having the following composition:

| | G. |
|---|---|
| Product resulting from the action of N-($\beta$-aminoethyl)thioglycolamide on a methyl methacrylate/maleic anhydride copolymer obtained in accordance with Example 16 | 12.5 |
| Ammonia (20%) q.s. for pH 9.8. | |
| Water q.s. for 100 g. | |

After an interval of 20 minutes, the hair is abundantly rinsed for at least two minutes with hot water.

A permanent wave of very good quality and stability is obtained.

EXAMPLE 27

There is prepared a solution having the following composition:

| | G. |
|---|---|
| Product resulting from the action of N-($\beta$-aminoethyl)thioglycolamide on an acrylonitrile/maleic anhydride copolymer obtained in accordance with accordance with Example 17 | 13 |
| Urea | 9 |
| Ammonia (20%) q.s. for pH 9.5. | |
| Water q.s. for 100 g. | |

When applied to the hair in accordance with the technique of Example 25, this solution gives a permanent deformation of the hair of very good quality.

EXAMPLE 28

For treating the hair in accordance with the invention, a solution having the following composition is prepared:

| | G. |
|---|---|
| Product resulting from the reaction of N-($\beta$-aminoethyl)thioglycolamide with an ethylene/maleic anhydride copolymer obtained in acordance with Example 19 | 8 |
| 20% ammonia q.s. for pH 9.5. | |
| Water q.s. for 100 g. | |

The hair is impregnated with this solution and a styling is effected in a conventional manner. There is thus obtained a permanent deformation which imparts to the hair style produced properties which are clearly superior to those obtained by the usual method.

In the course of this styling, which comprises the following phases:

moistening winding on curlers drying (the excess of ammonia evaporates), there remains in and on the fiber a part of the polymer formed, the result of which is that the hair is well set, this being achieved by a very simple operation.

The hair treating examples set forth above all employed a pH of 9.5. It should be noted, however, that a pH range of acid to basic could be used.

Turning now to the polymers identified as type III, they are essentially polysulfhydrylated polymers having recurring units of the formula

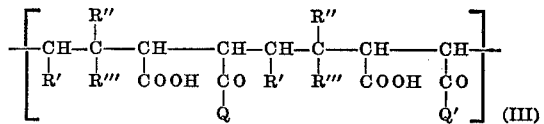

in which

R' and R" are selected from the group consisting of hydrogen, lower alkyl having 1–4 carbon atoms, phenyl and lower alkoxy having 1–4 carbon atoms;

R''' is selected from the group consisting of hydrogen, —OCOCH₃, —COOCH₃ and —C≡N;

Q has the formula:

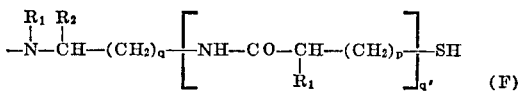

in which:

R₁ is selected from the group consisting of hydrogen and methyl,

R₂ is selected from the group consisting of hydrogen and —COOH, $q$ is 1–5, inclusive;

$q'$ is equal to 0 or 1, $p$ is equal to 0 or 1,

Q' has the formula:

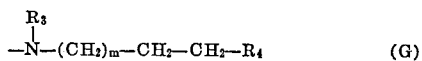

in which:

R₃ is selected from the group consisting of hydrogen and lower alkyl having 1–4 carbon atoms, R₄ is selected from the group consisting of lower alkyl having 1–4 carbon atoms, —O—(CH₂)₂OH when $m$ is 0 and

in which $r$ and $r'$ are selected from the group consisting of lower alkyl having 1–4 carbon atoms and together with the nitrogen atom to which they are attached form a ring selected from the group consisting of morpholinyl and piperidinyl and $m$ is 0–4.

The proportions of the substituents Q and Q' of Formula III may be varied within broad limits, for example from 1 to 99% and preferably from 20 to 80% of the thiols.

In a preferred embodiment the polymercapto condensation polymers hereinbefore defined have a value of $n$ such that they are soluble in water, at least in an alkaline medium.

A process for manufacturing the aforesaid polymers comprises condensing aminothiols or amino mercaptoamines having the following formula:

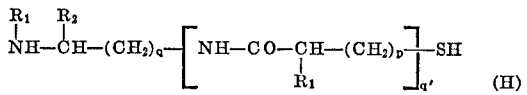

in which R₁, R₂, $q$, $p$, and $q'$ have the same values already given, and condensing alkyl amines having the formula:

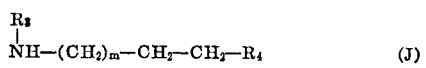

in which:

R₃, R₄ and $m$ have the values hereinbefore assigned thereto on a copolymer having the formula:

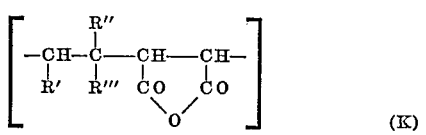

in which:

R', R" and R''' have the values hereinbefore indicated.

Among the compositions which may be substituted as Q in Formula F are β-mercaptoethylamine, cysteine, N-monomethyl mercaptoethylamine, and N-(β-aminoethyl) thioglycolamide.

Among the compositions which may be substituted as Q' in Formula G are butylamine, N,N-diethylpropylenediamine and N-(β-aminoethyl) morpholine.

The polymers corresponding to Formula III may be easily prepared by reacting with polymers corresponding to Formula K a mixture in the proportions previously specified of aminothiols or amido mercapto-amines according to Formula H and amines according to Formula J. The reaction is carried out in an aqueous medium at room temperature. The desired product is then isolated by precipitation in an acid medium.

During the condensation it is desirable to add a base to neutralize the carboxylic function which forms and permits the dissolution of the polymers formed.

It should be noted that the plastic properties of the films formed by the polymers depend to a certain extent on the nature of the base which is used to neutralize the carboxylic function. The polymers which have just been described are particularly valuable for use for cosmetic purposes. In particular, they may be used to prepare compositions for "setting" the hair which form transparent, lustrous, colorless flexible films. Moreover, as a consequence of the presence of the mercapto groups, these polymers have excellent affinity for the hair and excellent resistance against absorbing moisture from the air.

In accordance with the invention, it is possible to vary the resistance of these films to humidity as desired by varying the proportions of the substituents Q and Q' in the copolymers. The resistance to humidity increases with any increase in the proportion of the substituent Q.

The resinous polymers of type III may be used as "setting" compositions, either in the form of lotions containing a low percentage of polymers, or in the form of gels having a high percentage of polymers. These compositions make it possible to make hair "sets" last considerably longer, while rendering the hair easy to manage, soft in appearance, lustrous and silky.

Depending on the objective sought, the polymers of type III may be used alone or mixed with other cosmetic agents, e.g. plasticizers such as glycol ethers, cationic surfactants such as quaternary ammoniums, swelling agents such as urea, perfumes, sequestrants, pigments, etc.

Also, several of the resinous polymers of type III may be used as a mixture with each other, or they may be used in mixtures containing other known resins, that may be used in cosmetic compositions.

When they are used for "setting" the hair, the polymers may be advantageously dissolved in aqueous alcoholic solutions of between 20 and 50 degrees and at concentrations preferably of the order of 2 to 3%, but which may rise to 10% or higher. Higher concentrations of the polymer are operatively expensive.

It is also preferable to neutralize the carboxylic function present with a base such as one of the amino alcohols, which have shown themselves to be particularly suitable for this purpose, in cosmetic compositions.

It is also noteworthy that when polymers of type III are used to impregnate keratinic textile fibers such as wool, these fibers may be more effectively dyed with reactive dyes.

In order that this embodiment of the invention may be clearly understood several illustrative examples will now be described without limiting the scope of the invention to the details thereof.

EXAMPLE 29

Condensation of β-mercaptoethylamine and N,N-diethylpropylene diamine on an ethylene/maleic anhydride copolymer The copolymer having the following recurring units having the formula is prepared:

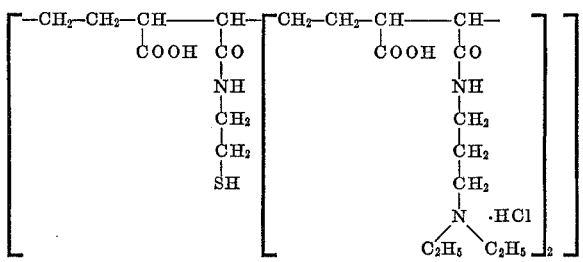

37.8 g. (⅓ mol) of the hydrochloride of β-mercaptoethylamine, 86.6 g. (⅔ mol) of N,N-diethylpropylene diamine and 600 cc. of water are placed in a receiver provided with an agitator, a thermometer, a tube for supplying nitrogen, and a dropping funnel.

13.3 g. (⅓ mol) of sodium hydroxide are then added to liberate the amine. Then, while stirring and cooling the solution, 71.5 g. (0.5 mol) of the ethylene/maleic anhydride copolymer sold by the Monsanto Chemical Co. as DX 840-11 are then added, the ratio of ethylene to maleic anhydride being 1:0.88. The specific viscosity of the copolymer at 25° C. has been brought to 0.1 at a concentration of 1% when in solution in dimethylformamide.

After having introduced the polymer into the receiver, 20 g. (0.5 mol) of sodium hydroxide are added to the reaction mixture in small tablets. Then 71.5 g. of the ethylene/maleic anhydride copolymer are added followed by 20 g. of sodium hydroxide tablets in small portions.

At the end of 3 or 4 hours the reaction is terminated and the desired product is isolated by acidification, salted out by means of sodium chloride.

This yields 235 g. of the desired copolymer which appears in the form of a powder which is soluble in water at a neutral or alkaline pH. This represents a yield of about 80 to 85%.

It should be noted that in the final product the tertiary amine function is present in the form of the hydrochloride and that the product contains about 12.5% of sodium chloride, as determined by an analysis of the chloride ion content.

The product is then purified by dissolving it in a mixture of dimethyl formamide and alcohol, the insoluble sodium chloride being eliminated by filtration. The desired product is precipitated from the filtrant by adding ether.

The following analyses have been made:

| | Percent | |
|---|---|---|
| | Calculated | Found |
| (a) Of the unpurified product: | | |
| Cl- | 8.45 | 16 |
| (Theoretical hydrochloride content) | | |
| —SH | [1] 3.34 | [1] 2.7 |
| Total—SH | | 3.3 |
| (Taking into account the sodium chloride present) | | |
| (b) Of the purified product: | | |
| Cl- | [2] 8.45 | 9.15 |
| —SH | [1] 3.78 | [1] 2.10 |
| Total—SH | | [1] 2.76 |
| (Taking into account the sodium chloride present) | | |

[1] Free SH.
[2] There was a 1.15% residue of sodium chloride.

The expression "Total—SH" is used to indicate the sum of the free —SH groups in the product and the —SH groups which could be separated from the oxidized (—S—S—) portion of the product by total reduction during the analysis.

EXAMPLE 30

Condensation of cysteine and the N,N-diethylpropylenediamine on an ethylene/maleic anhydride copolymer This is effectuated under the same conditions as those described in Example 29, except that an equivalent quantity of cysteine is substituted for the β-mercaptoethylamine. This yields 47% by weight of a gum which, after purification by dissolving it in dimethyl formamide and precipitation with ether, appears in the form of a pulverulent mass which is soluble in water at a neutral or alkaline pH.

The resulting product was analyzed, with the following results:

| | Calculated, percent | Found, percent |
|---|---|---|
| Cl- | 8.05 | 7.6 |
| Free—SH | 3.62 | 1.68 |
| Total—SH | | 2.96 |

EXAMPLE 31

Condensation of N-(B-aminoethyl)thioglycolamide and N,N - diethylpropylenediamine on an ethylene/maleic anhydride copolymer This process is carried out under the same conditions as those described in connection with Example 29, except that the β-mercaptoethylamine is replaced by an equivalent quantity of N-(β-aminoethyl) thioglycolamide.

After vacuum drying the process yields about 89% by weight of the desired product in the form of a powder soluble in water at a neutral or alkaline pH.

The following analysis of the end product was made:

| | Calculated, percent | Found, percent |
|---|---|---|
| Cl- | 7.93 | 15 |
| (Which corresponds to 11.7% sodium chloride) | | |
| Free—SH | 3.13 | 2.45 |
| Total—SH | | 2.6 |
| (Taking into account the sodium chloride) | | |

The product thus obtained may be purified by dissolving it in dimethyl formamide and precipitating it with ether.

N-(β-aminoethyl)thioglycolamide having the formula:

$$HS—CH_2—CONH—CH_2—CH_2—NH_2$$

has been obtained in the following manner:

64 g. (1 mol.) of 96% ethylenediamine are placed in a recipient provided with an agitator, a reflux cooling column, a thermometer, a dropping funnel and a tube for supplying nitrogen. 126 g. (1 mol.) of a 95% solution of ethyl thioglycolate in 100 cc .of absolute alcohol are then introduced drop by drop, while constantly stirring and maintaining the temperature at about 40°–45° C. When this addition has been completed the solution is heated under reflux for 20 minutes.

The product precipitates on cooling. After draining and drying 107 g. of N-(β-aminoethyl)thioglycolamide are obtained, representing a yield of about 80%.

The substance thus obtained is in the form of a white crystalline powder, 99% pure, having a melting point of 133° C.

EXAMPLE 32

Condensation of β-mercaptoethylamine and butylamine on an ethylene/maleic anhydride copolymer This condensation yields about 89% by weight when carried out as described in the foregoing examples, except that the N,N-diethylethylenediamine is replaced by a corresponding quantity of butylamine.

After precipitation in an acid medium, the product is washed with water and, when dried, is a powder soluble in water in an alkaline medium.

It should be noted that, in the present case, the isolated composition is not contaminated with sodium chloride, so that further purification is unnecessary.

The composition obtained has been analyzed as follows:

|  | Calculated, percent | Found percent |
|---|---|---|
| Free—SH | 4.9 | 3.6 |
| Total—SH |  | 4.9 |

EXAMPLE 33

Condensation of β-mercaptoethylamine and N-(β-aminoethyl)morpholine on an ethylene/maleic anhydride copolymer The condensation is carried out with a yield of about 65% by proceeding as described in Example 29, except that the N,N-diethylethylenediamine is replaced by an equivalent quantity of N-(β-aminoethyl)morpholine.

The product obtained is in the form of a powder which is soluble in water at a neutral or alkaline pH. The powder was analyzed with the following results:

|  | Calculated, percent | Found, percent |
|---|---|---|
| Cl⁻ | 8.7 | 11.7 (ClNa 4.8) |
| Total—SH | 3.92 | 3.85 |
| Free—SH | 3.92 | 2.35 |

EXAMPLE 34

Condensation of N-(β-aminoethyl)thioglycolamide and butylamine on an ethylene/maleic anhydride copolymer The condensation is carried out with a yield of about 85% by proceeding as described in Example 31, except that the N,N-diethylpropylene diamine is replaced by an equivalent quantity of butylamine.

The product thus obtained is soluble in water in an alkaline medium, and was analyzed with the following results:

|  | Calculated, percent | Found percent |
|---|---|---|
| Total—SH | 4.65 | 4.55 |
| Free—SH | 4.65 | 2.52 |

EXAMPLE 35

Condensation of β-mercaptoethylamine and N,N-diethylpropylenediamine on an ethylene/maleic anhydride copolymer The desired product is obtained with a yield of about 82% by weight by following the same procedure as in Example 29, except that the quantities of aminothiol and diamine are altered so that each is equal to 0.5 mol. for a total of 1 mol. of ethylene/maleic anhydride copolymer.

After drying the product obtained is a powder which is soluble in water at a neutral or alkaline pH. This powder has been analyzed with the following results:

|  | Calculated, percent | Found, percent |
|---|---|---|
| Free—SH | 6.28 | 4.9 |
| Total—SH |  | 5.5 |

EXAMPLE 36

Condensation of β-mercaptoethylamine and N,N-diethylpropylenediamine on an ethylene/maleic anhydride copolymer The process is the same as that of Example 29, except that ⅕ of a mol. of β-mercaptoethylamine hydrochloride is used for each ⅘ mol. of N,N-diethylpropylenediamine.

The product is purified by dissolving it in dimethyl formamide and precipitating it with ether. The composition is obtained in the form of the hydrochloride, with a yield of about 50% by weight. It is soluble in water at a neutral or alkaline pH. The following analysis was made:

|  | Calculated, percent | Found, percent |
|---|---|---|
| Cl⁻ | 9.7 | 8.2 |
| Free—SH | 2.2 | 1.22 |
| Total—SH |  | 1.76 |

EXAMPLE 37

Condensation of β-mercaptoethylamine and butylamine on a styrene/maleic anhydride copolymer The copolymer having the following recurring units having the formula is prepared:

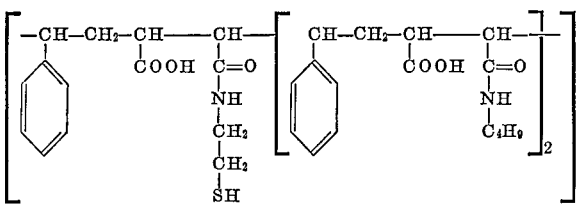

in the same manner as in Example 29, but utilizing:

instead of the ethylene/maleic anhydride copolymer an equivalent quantity of the styrene/maleic anhydride copolymer sold under the trade name "Resin SMA 1000 A" by the Texas Butadiene Chemical Corp., and in which the styrene/maleic anhydride ratio is 1:0.86; and instead of N,N-diethylpropylenediamine, an equivalent quantity of butylamine:

The desired product is isolated in a conventional manner by precipitation in an acid medium. A yield of 93% is obtained and the product is in the form of a powder, an analysis of which gave the following results:

|  | Calculated, percent | Found percent |
|---|---|---|
| Free—SH | 3.88 | 1.1 |
| Total—SH | 3.88 | 3.16 |
| N | 4.53 | 3.95 |

EXAMPLE 38

Condensation of β-mercaptoethylamine and n-butylamine on a vinyl acetate/maleic anhydride copolymer A polymercapto condensation copolymer having the following recurring units having the formula is prepared:

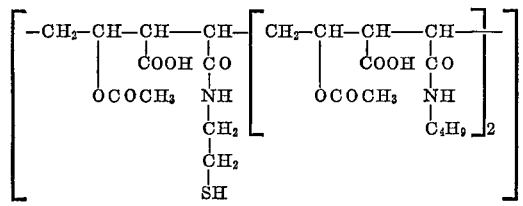

by condensing β-mercaptoethylamine and n-butylamine on a vinyl acetate/maleic anhydride copolymer, in the following manner:

The starting copolymer is a vinyl acetate/maleic anhydride copolymer obtained in a conventional manner by copolymerizing equimolecular quantities of vinyl acetate and maleic anhydride in toluene in the presence of benzoyl peroxide, which acts as a catalyst.

This copolymer, in a 1% solution in dimethyl formamide, has a specific viscosity of 0.17 at a temperature of 25° C.

The anhydride function has been introduced in a proportion such that the molar ratio between the vinyl acetate and maleic anhydride in this polymer is 0.93/1.

The copolymerization has been so carried out as to produce a copolymer which is water-soluble in a basic medium.

3.89 grams (0.33 mol) of the hydrochloride of β-mercaptoethylamine, 4.9 grams (0.066 mol) of n-butylamine and 100 cm.³ of water are placed in a vessel provided with an agitator, a thermometer, a tube for introducing nitrogen, and a dropping funnel.

The amine is then liberated from its hydrochloride by adding 3.3 cm.³ (0.033 mol) of an aqueous 40% sodium hydroxide.

8.9 grams (0.5 mol) of the vinyl acetate/maleic anhydride copolymer are then added, while stirring and cooling the solution.

5 cm.³ (0.5 mol) of an aqueous 40% sodium hydroxide solution are then added to liberate the amine salifying the carboxyl group of the copolymer.

8.9 grams (0.5 mol) of the vinyl acetate/maleic anhydride copolymer are then added, together with 5 cm.³ (0.5 mol) of an aqueous 40% sodium hydroxide solution.

The reaction is completed in three hours.

The solution is then acidified with hydrochloric acid to precipitate the desired product, which yields 78% by weight, i.e. 19.5 grams of the copolymer according to the invention.

The product is yielded in the form of a white powder which is water soluble at an alkaline pH, and which has the following analysis:

SH percent calculated: 5.24. SH percent found: 2.7.

After reducing the oxidized form of the product, a new analysis was made, with the following results:

SH percent calculated: 5.24. SH percent found: 5.3.

EXAMPLE 39

Condensation of β-mercaptoethylamine and N,N-diethylpropylenediamine on a methyl methacrylate/maleic anhydride copolymer In accordance with the invention a poly mercapto condensation polymer having the following recurring units having the formula is prepared:

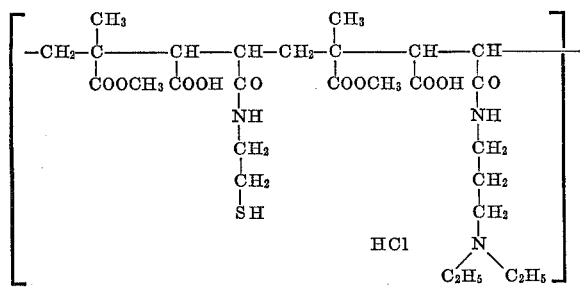

by condensing β-mercaptoethylamine and N,N-diethylpropylenediamine on a methyl methacrylate/maleic anhydride copolymer, in the following manner:

The starting polymer is a methyl methacrylate/maleic anhydride copolymer obtained in a conventional manner by copolymerizing equimolecular quantities of methyl methacrylate and maleic anhydride in toluene in the presence of azobisisobutyronitrile, which acts as a catalyst.

A 1% solution of this polymer in dimethylformamide has a specific viscosity of 0.088 at a temperature of 25° C.

The molar ratio between the methyl methacrylate and the maleic anhydride in this polymer is determined by measurement of the anhydride function as equal to 1.52/1.

Under the same conditions as in Example 29 β-mercaptoethyl amine and N,N-diethylpropylenediamine are condensed on the methyl methacrylate/maleic anhydride copolymer which has been obtained in the manner already described, using 0.5 mol of aminothiol and 0.5 mol of diamine per mol. of methyl methacrylate/maleic anhydride copolymer.

After precipitation and purification, a yield of 68% by weight of the desired copolymer is obtained in the form of a white powder which is water soluble at a neutral or alkaline pH.

This powder has been analyzed as follows:

SH percent calculated: 4.45. SH percent found: 2.71.

After the oxidized form of the product has been reduced, a new analysis yielded the following results:

SH percent calculated: 4.45. SH percent found: 3.80.

EXAMPLE 40

Condensation of N-(β-aminoethyl)thioglycolamide and n-butylamine on an acrylonitrile/maleic anhydride copolymer In accordance with the invention a polymercapto condensation polymer having the following recurring units having the formula is prepared:

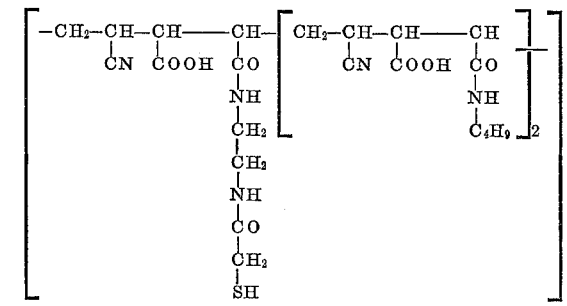

by condensing N-(β-aminoethyl)thioglycolamide and n-butylamine on an acrylonitrile/maleic anhydride copolymer, in the following manner.

An acrylonitrile/maleic anhydride copolymer is used as the starting copolymer. This is obtained by copolymerizing equimolecular quantities of acrylonitrile and maleic anhydride in toluene in the presence of benzoyl peroxide, which acts as a catalyst.

The copolymer obtained, when in a 1% solution in dimethyl formamide, has a specific viscosity of 0.055 at a temperature of 25° C.

The molar ratio between the acrylonitrile and the maleic anhydride, is determined by measuring the amine function as equal to 1.19/1.

The method is the same as that of Example 38, with the condensation of diamine and aminothiol on this copolymer, except that the β-mercaptoethylamine is replaced by a molecularly equivalent quantity of N-(β-aminoethyl)thioglycolamide, and the vinyl acetate is replaced by acrylonitrile.

After the resulting product has been precipitated by means of hydrochloric acid, it is dried, and a yield of 47% by weight of the desired product is obtained.

The product is in the form of a white powder which is water-soluble at an alkaline pH, and has been analyzed with the following results:

SH percent calculated: 4.34. SH percent found: 2.6.

After reduction of the oxidized form of the product, a new analysis yielded the following results:

SH percent calculated: 4.34. SH percent found: 3.5.

EXAMPLE 41

Condensation of β-mercaptoethylamine and N,N-diethylpropylenediamine on a methyl acrylate/maleic anhydride copolymer A polymercapto condensation polymer having the following recurring units having the formula is prepared:

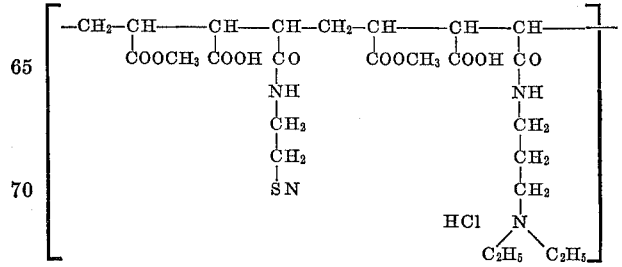

by condensing β-mercaptoethylamine and N,N-diethylpropylenediamine on a methyl acrylate/maleic anhydride copolymer obtained in a conventional manner by copolymerizing equimolecular quantities of methyl acrylate and maleic anhydride in toluene in the presence of benzoyl peroxide, which acts as a catalyst.

This copolymer, as a 1% solution in dimethylformamide has a specific viscosity of 0.093 at a temperature of 25° C.

The molar ratio between the methyl acrylate and maleic anhydride has been determined by measurement of the anhydride function to be equal to 0.8/1.

By treating the copolymer obtained in this manner in the same way as that described in Example 39, a yield amounting to 70% by weight of a white precipitate is obtained. This precipitate, when dried, appears in the form of a powder which is water-soluble at a neutral or alkaline pH. An analysis of this powder yielded the following results:

SH percent calculated: 5.25. SH percent found: 3.54.

After reducing the oxidized form of the product, a new analysis gave the following results:

SH percent calculated: 5.25. SH percent found: 4.27.

EXAMPLE 42

Process for producing a hair-setting lotion having the following composition:

| | G. |
|---|---|
| Resin resulting from the condensation of β-mercaptoethylamine and N,N-diethylpropylenediamine on the ethylene/maleic anhydride copolymer described in Example 29 | 3 |
| Ethyl alcohol, q.s.p. 25°. | |
| 2-amino 2-methyl 1-propanol, q.s.p., pH 8.5. | |
| Tetrasodium salt of ethylene diamine tetracetic acid | 0.1 |
| Perfume | 0.2 |
| Water, q.s.p. 100 cc. | |

The resin is first dissolved in 60 cc. of water in the presence of 2-amino 2-methyl 1-propanol unitil the pH reaches 8.2. The tetrasodium salt of ethylene diamine tetracetic acid is then added to serve as a sequestrant for metals, followed by the mixture of ethyl alcohol and perfume. The volume is then increased to 100 cc. by adding distilled water and, to a pH of 8.5, by adding 2-amino 2-methyl 1-propanol.

20 cc. of this solution are then applied to hair which has been washed and dried, taking care to distribute the solution uniformly over the hair. The hair is then set in a conventional manner. Hair which has been thus treated is lustrous, soft, silky and easily arranged.

The lotion which has just been described materially prolongs the life of the "set" while keeping the hair in shape without making it dull, even in very humid weather.

EXAMPLE 43

A setting lotion having the following composition is prepared:

| | G. |
|---|---|
| The condensation product of the ethylene/maleic anhydride copolymer and N-(β-aminoethyl) thioglycolamide and N,N-diethylpropylene obtained as in Example 31 | 2 |
| Ethyl alcohol, q.s.p. 25°. | |
| 2-amino 2-methyl 1,3-propanediol, q.s.p. pH 8. | |
| Tetrasodium salt of ethylene diamine tetracetic acid | 0.1 |
| Water, q.s.p. 100 cc. | |

The procedure is the same as that of Example 42. The results obtained are excellent.

EXAMPLE 44

A setting lotion having the following composition is prepared:

| | G. |
|---|---|
| The condensation product of the ethylene/maleic anhydride copolymer with β-mercaptoethylamine and butylamine, obtained as in Example 32 | 2.5 |
| Ethyl alcohol, q.s.p. 50°. | |
| Triethanolamine, q.s.p. pH=7. | |
| Tetrasodium salt of ethylene diamine tetracetic acid | 0.1 |
| Water, q.s.p. 100 cc. | |

The resin is dissolved in 95% ethyl alcohol and triethanolamine is added to facilitate stabilization, followed by the tetrasodium salt of ethylene diamine tetracetic acid. The volume is increased to 100 cc. by adding water and the solution is brought to the desired pH by adding more triethanolamine. This setting lotion yields results comparable to those obtained with the lotions described in the previous examples.

EXAMPLE 45

A setting lotion having the following composition is prepared in the same manner as described in connection with Example 44:

| | G. |
|---|---|
| Resin resulting from the condensation of β-mercaptoethylamine and N,N-diethylpropylenediamine on the ethylene/maleic anhydride copolymer, obtained as in Example 29 | 2.5 |
| Tetrasodium salt of ethylene diamine tetracetic acid | 0.1 |
| N,N-dimethyl ethanolamine, q.s.p. pH=8. | |
| Ethyl alcohol, q.s.p. 25°. | |
| Water, q.s.p. 100 cc. | |

The application of this lotion to the hair yields excellent results.

EXAMPLE 46

A setting lotion having the following composition is prepared in the same manner as described in connection with Example 42.

| | G. |
|---|---|
| Condensation prouct of ethylene/maleic anhydride copolymer with β-mercaptoethylamine and N,N-diethylpropylenediamine, obtained as in Example 35 | 2 |
| Vinyl pyrrolidone/vinyl acetate copolymer | 1 |
| Ethyl alcohol, q.s.p. 35°. | |
| 2-amino 2-methyl 1-propanol, q.s.p. pH=9. | |
| Perfume | 0.2 |
| Water, q.s.p. 100 cc. | |

This lotion also gives very satisfactory results:

EXAMPLE 47

An aerosol bomb containing the following ingredients is used to provide an aerosol foam for setting the hair:

| | G. |
|---|---|
| Condensation product of ethylene/maleic anhydride copoylmer with cysteine and N,N-diethylpropylene obtained as in Example 30 | 3 |
| Ethyl alcohol, q.s.p. 25°. | |
| 2-amino 2-methyl 1-propanol, q.s.p. pH=8.5. | |
| Emulsifying agent (cetyl-stearyl alcohol condensed with 15 mols. of ethylene oxide) | 2 |
| Perfume | 0.2 |
| Water, q.s.p. 93 g. | |
| Propellant | 7 |

The aerosol bomb is made by first solubilizing the resin in 30 cc. of water in the presence of 2-amino 2-methyl 1-propanol. Cetyl-stearyl alcohol (which has first been dissolved in 20 cc. of water, while being slightly heated) is then added, after which the mitxure of ethyl alcohol and perfume is added.

The pH is then adjusted to 8.5 by adding the necessary quantity of 2-amino 2-methyl 1-propanol and the weight increased to 93 g. by adding distilled water.

The bomb is completed by adding 7 g. of a conventional propellant such as the fluorinated hydrocarbon, dichlorodifluoromethane, sold as "Freon 12."

The product is applied in the form of a very transient foam, which facilitates its uniform distribution throughout the hair, which has previously been washed and dried.

The hair is then set in the usual manner, with excellent results.

EXAMPLE 48

In accordance with the invention a setting lotion having the following composition is prepared:

|  | G. |
|---|---|
| Resin resulting from the condensation of β-mercaptoethylamine and n-butylamine, on vinyl acetate/maleic anhydride copolymer, as in Example 38 | 3 |
| Ethyl alcohol, q.s.p. 25°. | |
| 2-amino 2-methyl 1-propanol, q.s.p. pH=8.5. | |
| Tetrasodium salt of ethylene diamine tetracetic acid | 0.1 |
| Perfume | 0.2 |
| Water, q.s.p. 100 cc. | |

The process is begun by dissolving the resin in 60 cc. of water in the presence of 2-amino 2-methyl 1-propanol to a final pH of 8.2. The tetrasodium salt of ethylene diamine tetracetic acid is added to serve as a sequestrant for metals, followed by the mixture of ethyl alcohol and perfume. The volume is increased to 100 cc. by adding distilled water and the pH adjusted to 8.5 by adding more 2-amino 2-methyl 1-propanol.

20 cc. of the solution obtained in this manner are applied to hair which has been washed and dried, taking care to distribute the solution uniformly. The hair is then set in a conventional manner. Hair treated in this way is bright, soft, silky, vibrant and easily put up.

The lotion which has just been described remarkably prolongs the life of the wave without causing the hair to become dull, even in very humid weather.

EXAMPLE 49

In accordance with the invention, a setting lotion having the following composition is prepared:

|  | G. |
|---|---|
| The condensation product of β-mercaptoethylamine and N,N-diethylpropylenediamine on the methyl methylacrylate/maleic anhydride copolymer obtained as in Example 39 | 2 |
| Ethyl alcohol, q.s.p. 25°. | |
| 2-amino 2-methyl 1,3-propanediol, q.s.p. pH=8. | |
| Tetrasodium salt of ethylene diamine tetracetic acid | 0.1 |
| Water, q.s.p. 100 cc. | |

When used as in Example 48, equally good results are obtained.

EXAMPLE 50

In accordance with the invention an aerosol foam for projection from a bomb to use in setting the hair is prepared from the following constituents:

|  | G. |
|---|---|
| Condensation product of the acrylonitrile/maleic anhydride copolymer with 1(β-aminoethyl) thioglycolamide and n-butylamine, obtained as in Example 40 | 3 |
| Ethyl alcohol, q.s.p. 25°. | |
| 2-amino 2-methyl 1-propanol, q.s.p. pH=8.5. | |
| Emulsifying agent (cetyl stearyl alcohol condensed with 15 mols. of ethylene oxide) | 2 |
| Perfume | 0.2 |
| Water, q.s.p. 98 g. | |
| Propellant | 7 |

The aerosol bomb is made by first dissolving the resin in 30 cc. of water in the presence of 2-amino 2-methyl 1-propanol. Cetyl stearyl alcohol which has been dissolved in 20 cc. of water, while heating it slightly, is then added, after which the mixture of ethyl alcohol and perfume is added.

The pH is then brought to 8.5 by adding the necessary quantity of 2-amino 2-methyl 1-propanol and the volume increased to 93 g. by adding distilled water.

The aerosol bomb is pressurized by adding 7 g. of a conventional propellant such as the dichlorodifluoromethane sold under the tradename "Freon 12."

The product is applied as a very transient foam, thus facilitating its distribution through the previously washed and dried hair.

The hair is then "set" in a conventional manner, with excellent results.

Turning now to the polymers identified as type IV, they are essentially polysulfhydrylated polymers having recurring units of the formula:

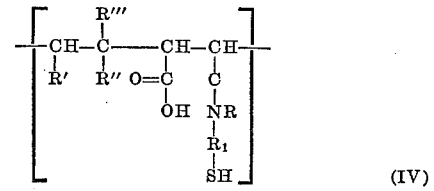

in which:

$R_1$ is selected from the group consisting of alkylene having 2 to 4 carbon atoms and alkylene having 2–4 carbon atoms substituted with a member selected from the group consisting of carboxy and carbalkoxy.

R is selected from the group consisting of hydrogen, methyl and ethyl.

R' and R" are selected from the group consisting of hydrogen, lower alkyl having 1–4 carbon atoms, phenyl and lower alkoxy having 1–4 carbon atoms and R''' is selected from the group consisting of hydrogen,

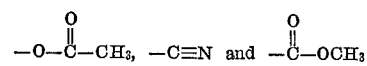

Another object of this embodiment of the invention is to provide compositions comprising polysulfhydrylated polymers of type IV corresponding to the general formula indicated above, in which R' and R" both represent a hydrogen atom and in which R''' represents an —OCOCH₃ radical, a —COOCH₃ radical, or a —C≡N radical.

A further object of this embodiment of the invention is to provide compositions comprising polysulfhydrylated polymers of type IV corresponding to the above general formula in which R' represents a hydrogen atom, R" represents a —CH₃ radical and R''' represents the

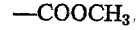

radical.

This present embodiment of this invention is also directed to new aqueous solutions for treating keratinic fibers and particularly hair, which are characterized by the fact that they contain at least one of the above-defined polysulfhydrylated copolymers of type IV which are soluble in water.

The present invention is likewise directed to a process of treating keratinic fibers, and particularly hair, which process is characterized by the fact that the fibers are impregnated with solutions of polysulfhydrylated copolymers of type IV. Preferred solutions are aqueous solutions containing 1 to 20% by weight of the polymers and having a pH between 4.5 and 10.

In order that this portion of the invention may be clearly understood, several detailed embodiments thereof will be described in the following examples, purely by way of illustration without limiting the scope of the invention to the details thereof.

EXAMPLE 51

A copolymer having the following recurring units having the formula is prepared:

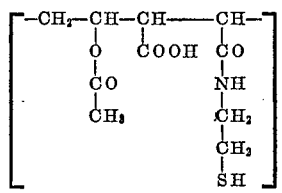

This is accomplished, as hereinafter described, by condensing β-mercaptoethylamine on a maleic anhydride/vinyl acetate copolymer.

The starting product is a vinyl acetate/maleic anhydride copolymer produced in a conventional manner by copolymerizing in toluene equimolecular quantities of vinyl acetate and maleic anhydride in the presence of benzoyl peroxide, which acts as a catalyst.

The vinyl acetate-maleic anhydride copolymer, used in the present example in a 1% solution in dimethylformamide and at a temperature of 25° C., has a specific viscosity of 0.17.

The molar ratio between the vinyl acetate and maleic anhydride in this copolymer has been found by measurement of the anhydride function to be 0.93/1.

In order to effect condensation of the β-mercaptoethylamine, 11.35 g. (0.1 mols.) of β-mercaptoethylamine hydrochloride and 120 cm.$^3$ of water are placed in a flask provided with agitating means, a thermometer, a tube for introducing nitrogen, and a dropping funnel.

10 cm.$^3$ (0.1 mol) of an aqueous 40% sodium hydroxide solution are added so as to liberate the amine from the hydrochlorate.

8.9 g. (0.05 mol) of the vinyl acetate/maleic anhydride copolymer and 5 cm.$^3$ (0.05 mol) of an aqueous 40% sodium hydroxide solution, are then added, while agitating and cooling, so as to liberate the amine salifying the carboxyl of the copolymer.

8.9 g. (0.05 mol) of the vinyl acetate/maleic anhydride copolymer and 5 cm.$^3$ (0.05 mol) of an aqueous 40% sodium hydroxide solution are then added simultaneously.

After waiting three hours the mixture is acidified with concentrated hydrochloric acid, washed with water, and dried, thus producing a yield of 83% by weight, i.e. 21.2 g., of a white powder which is soluble in water at an alkaline pH.

The resulting product was analyzed as follows:
SH percent calculated: 12.95. SH percent found: 7.13.
A further measurement of the SH, after reduction of any radicals containing oxidized SH which remained, yielded the following results:
SH percent calculated: 12.95. SH percent found: 12.17.

EXAMPLE 52

A polysulfhydrylated polymer having recurring units of the formula is prepared:

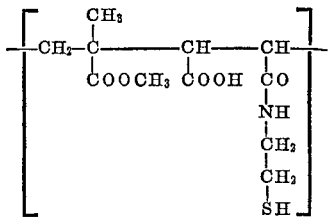

by reacting, as indicated above, β-mercaptoethylamine and a maleic anhydride/methyl methacrylate copolymer.

For this purpose the methyl methacrylate/maleic anhydride copolymer used is obtained in a conventional manner by copolymerizing in toluene equimolecular quantities of methyl methacrylate and maleic anhydride in the presence of diazo-isobutyronitrile, which acts as a catalyst.

The specific viscosity of this copolymer is a 1% solution in dimethylformamide is 0.088 at 25° C.

The molar ratio between the methyl methacrylate and maleic anhydride in this copolymer is determined by measuring the anhydride function to be 1.52/1.

The α-mercaptoethylamine is condensed on this copolymer in the same way as in Example 51.

A 70% yield by weight of a white powder which is soluble in water in an alkaline environment is obtained.
This product was analyzed as follows:
SH percent calculated: 10.1. SH percent found: 4.45.
The oxidized SH functions were then reduced, and the following analysis made:
SH percent calculated: 10.1. SH percent found: 6.15.

EXAMPLE 53

The following process is used to prepare a polysulfhydrylated copolymer having recurring units having the formula:

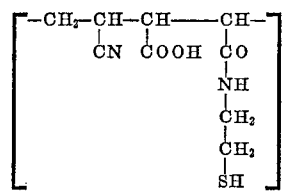

by condensing β-mercaptoethylamine on an acrylonitrile/maleic anhydride copolymer.

The process is started with an acrylonitrile/maleic anhydride copolymer obtained in a conventional manner by copolymerizing in toluene equimolecular quantities of acrylonitrile and maleic anhydride in the presence of benzoyl peroxide, which acts as a catalyst.

The specific viscosity of this copolymer in a 1% solution in dimethylformamide is 0.055 at a temperature of 25° C.

The molar ratio between the acrylonitrile and the maleic anhydride in the copolymer is determined, by measurement of the anhydride function, to be 1.19/1.

In the same way as in Example 51 the β-mercaptoethylamine is condensed on this copolymer and a 50% yield by weight is obtained of a white powder which is soluble in water in an alkaline environment. This was analyzed as follows:
SH percent calculated: 13.9. SH percent found: 7.3.
After reducing the oxidized SH groups the analysis was:
SH percent calculated: 13.9. SH percent found: 8.8.

EXAMPLE 54

A polysulfhydrylated polymer having recurring units having the following formula:

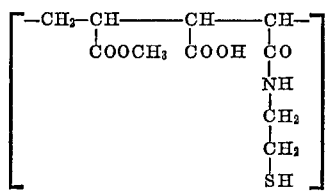

is prepared by condensing β-mercaptoethylamine on a methacrylate/maleic anhydride copolymer in the following manner:

The methacrylate/maleic anhydride copolymer used as a base is obtained in a conventional manner by polymerizing in toluene equimolecular quantities of methyl acrylate and maleic anhydride in the presence of benzoyl peroxide, which acts as a catalyst.

The specific viscosity of this copolymer in a 1% solution in dimethylformamide is 0.093 at a temperature of 25° C.

Measurement of the anhydride function shows that the molar ratio between the methyl acrylate and maleic anhydride in this copolymer is 0.9/1.

The β-mercaptoethylamine is condensed on the copolymer in the same way as in Example 51 with a yield of 67% by weight of a white powder which is soluble in water at an alkaline pH.

The powder thus obtained was analyzed with the following result:

SH percent calculated: 13. SH percent found: 6.37.

After reduction of any oxidized SH groups the following analysis was made:

SH percent calculated: 13. SH percent found: 7.47.

EXAMPLE 55

The polysulfhydrylated polymer having recurring units of the formula:

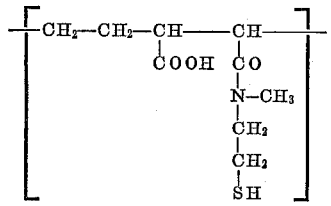

is prepared by condensing N-methyl-β-mercaptoethylamine on an ethylene/maleic anhydride copolymer in the following manner.

The base product is the ethylene/maleic anhydride copolymer sold by the Monsanto Chemical Co. under the trademark "DX-840-11" resin.

The specific viscosity of this polymer in a 1% solution in dimethylformamide is 0.1 at 25° C.

Measurement of the anhydride function shows that the molar ratio between the ethylene and the maleic anhydride in this copolymer is 1.6/1.

To condense the N-methyl-β-mercaptoethylamine, 28.6 g. (0.184 mole) of N-methyl-β-mercaptoethylamine hydrochloride and 120 cm.³ of water are placed in a flask provided with agitating means, a thermometer, and a dropping funnel.

18.4 cm.³ (0.181 mol) of a 40% sodium hydroxide solution are added to liberate the amine from the hydrochloride.

13.25 g. (0.92 mol) of the ethylene/maleic anhydride copolymer and 9.2 cm.³ (0.92 mol) of an aqueous 40% sodium hydroxide solution are added while agitating and cooling the mixture, so as to liberate the amine salifying the carboxyl of the copolymer.

13.25 g. (0.93 mol) of the copolymer and 9.2 cm.³ (0.92 mol) of an aqueous 40% sodium hydroxide solution are then added simultaneously.

When the reaction has been completed, the mixture is acidified with concentrated hydrochloric acid, and the precipitate washed with water and dried.

This results in a yield of 90% by weight of a powder which is soluble in water in an alkaline environment.

The resulting product was then analyzed with the following result:

SH percent calculated: 14. SH percent found: 5.75.

The product was also analyzed after reduction of the oxidized radicals, with the following results:

SH percent calculated: 14. SH percent found: 9.05.

EXAMPLE 56

In order to permanently wave hair in accordance with the invention a solution having the following composition is prepared:

G.

Polymer resulting from the reaction of β-mercaptoethylamine and a maleic anhydride/vinyl acetate copolymer prepared as in Example 51 _____ 12
Urea _____ 5
Ammonia pH 9.8.
Water, q.s.p. 100 g.

The hair is impregnated with this solution and rolled up on curlers in the usual way.

Each lock of hair is saturated with the above-described solution. Then, after waiting 10–15 minutes, the hair is carefully rinsed with hot water and fixed with hydrogen peroxide.

An excellent permanent wave results.

EXAMPLE 57

In order to permanently wave hair in accordance with the invention a solution having the following composition is prepared:

G.

Polymer resulting from the reaction of β-mercaptoethylamine on the maleic anhydride/vinyl methacrylate copolymer obtained in the process described in Example 52 _____ 9
Urea _____ 5
Ammonia q.s.p. pH 9.4.
Water, q.s.p. 100 g.

The hair is impregnated with this solution in the same way as in Example 56, except that no oxidizing solution is applied.

After the conventional waiting period one need only rinse the hair copiously for at least two minutes with hot water.

This produces a permanent wave which is of excellent quantity and holds up for a long time.

EXAMPLE 58

The following composition is prepared to treat the hair in accordance with the invention:

G.

Polysulfhydrylated polymer obtained by condensation of β-mercaptoethylamine on an acrylonitrile/maleic anhydride copolymer as in Example 53 _____ 13
Urea _____ 6
Ammonia, pH 9.
Water, q.s.p. 100 g.

This solution gives excellent results when used for "warm" permanents.

In this technique a conventional device is attached to each curler which brings it to a temperature of 65–90° C. No oxidizing lotion is used, but a pronounced, long lasting wave results.

EXAMPLE 59

A solution having the following composition is prepared for use as a setting lotion:

G.

Sulfhydrylated polymer resulting from the reaction of N-methyl-β-mercaptoethylamine and the maleic anhydride/ethylene copolymer according to Example 55 _____ 12
Ammonia, q.s.p. pH 9.6.
Water, q.s.p. 100 g.

The hair is impregnated with this solution and set in a conventional manner.

The hair is permanently deformed and the resulting set holds much better than those effectuated in the usual way.

This setting operation comprises the following steps:

Moistening
Rolling up on curlers
Evaporation of the ammonia and during this process part of the disulfide polymers remain on the fiber, so that the hereinbefore mentioned properties are imparted to the hair in a very simple way.

Turning now to the polysulfhydrylated polymers identified as type V, they are condensed from (1) an anhydried polymer selected from the group consisting of poly(acrylic anhydride), poly(itaconic anhydride), poly(mixed acrylic-methacrylic anhydride), poly(methacrylic anhydride (and poly(maleic anhydride) and (2) a member selected from the group consisting of (i) an aminothiol having the formula HS—R—NH—R' wherein R is selected from the group consisting of alkylene having 2–4 carbon atoms and alkylene having 2–4 carbon atoms substituted with a member selected from the group consisting of alkyl having 1–4 carbon atoms, carboxy carbalkoxy and R' is selected from the group consisting of hydrogen, methyl and ethyl and (ii) a mercaptoamide having the formula

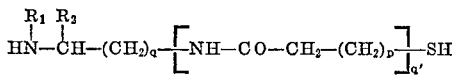

wherein $R_1$ is selected from the group consisting of hydrogen, methyl, ethyl and —$CH_2$—$CH_2$—OH, $R_2$ is selected from the group consisting of hydrogen and —COOH, $q$ is 1–5 inclusive, $q'$ is equal to 1 and $p$ is equal to 0 or 1, and optionally (3) with an amine selected from the group consisting of an amine having the formula

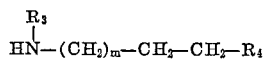

wherein $R_3$, $R_4$ and $m$ have the meanings given above.

Among the amino-thiols having the foregoing formula, the following may be cited by way of example:

β-mercaptoethylamine,
cysteine, and
ethylcysteinate.

Among the mercapto-amides corresponding to the above formula are those obtained from the esters of thioglycolic acid, thiolactic acid, or β-mercaptopropionic acid, and diamines such as ethylene diamine, hexamethylene diamine, and N-hydroxyethyl ethylene diamine.

In accordance with the embodiment of the invention it is also possible to condense amines which have no —SH groups on the poly(anhydrides) at the same time that the mercapto-amides or amino thiols are condensed thereon.

In this way the proportionate number of —SH groups in the polysulfhydrylated polymers can be reduced, while introducing into the formula of the polymer groups which permit it to impart particular qualities to the hair.

When the partial sulfhydrylated polymers are being prepared in accordance with the invention, it is possible to vary the proportions of amino thiol or mercapto amide and nonsulfhydryl amine on the polymer within broad limits ranging for example from 1 to 99%, but preferably from 20 to 80% of mercapto-amide or aminothiol in proportion to the nonsulfhydryl amine.

The polymer of type V can be used in cosmetic compositions, such as hair setting lotions in the form of aerosols or for treating keratinic textile fibers, particularly in order to facilitate dyeing them with reactive dyes.

The polysulfhydrylated polymers of type V have certain advantages over those polysulfhydrylated polymers heretofore described when used in either the cosmetic or the industrial textile field.

In the first place those polymers which are formed by polymerizing an anhydride are capable of combining with a substantially larger number of —SH groups than the polysulfhydrylated polymers heretofore known, which were made from resins which were copolymers of an anhydride and another monomer which did not combine with SH groups.

This property enables polymers according to the invention to exhibit a much higher reactivity toward keratinic substances.

Moreover, treatments utilizing these polymers are more consistent and homogeneous in their effects than treatments utilizing most other polysulfhydrylated polymers. In effect, during the polymerization of the copolymers, the proportions of the two monomers comprised by the copolymers vary from one molecule to the next and the products obtained may therefore differ in two ways, to wit: first, according to the lengths of their chains, and second, according to the proportion between the two monomers making up the copolymers.

On the other hand, these polymers all have the same chemical structure, the only possible difference between one molecule and another being a difference in the lengths of their chains.

It follows that these polymers are more easily reproduced and consequently produce more consistent results when they are applied to keratinic fibers.

Several methods of carrying out this aspect of the invention will now be described, purely by way of example.

In the examples which follow "$n$" corresponds to polymers that are soluble in water, alcohol or other organic solvent as determined in the specific example and $n$ has a value as indicated hereinbefore.

EXAMPLE 60

Preparation of poly(maleic anhydride) having recurring units of the formula:

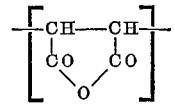

800 g. of maleic anhydride and 1000 ml. of dry benzene are placed in a flask provided with agitating means, cooling means, a thermometer, a dropping funnel and a tube for introducing nitrogen.

The mixture is brought to reflux and 104 g. of 85% benzoyl peroxide (i.e., 88 g. at 100%, or 11% by weight in proportion to the monomer) dissolved in 960 ml. of benzene are added little by little over 32 hours.

After heating for several hours, the polymer begins to precipitate. At the end of the heating and after cooling, the slightly colored precipitate is dried. It is then washed several times with benzene and dried in the air. The yield is 632 g. (about 79%) of a product in the form of a clear yellow powder.

Tests show that the proportion of anhydride is 100%.

The specific viscosity of a 1% solution of this polymer in dimethylformamide at 25° C. is 0.05.

EXAMPLE 61

Preparation of poly(itaconic anhydride) having recurring units of the formula:

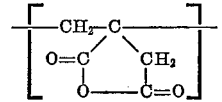

140 g. of itaconic anhydride (having a melting point of 66–67°) and 1,400 ml. of dry benzene are placed in a flask provided with agitating means, cooling means, a thermometer, a dropping funnel and a tube for introducing nitrogen.

The mixture is brought to reflux and 28 g. of 85% benzoyl peroxide (i.e. 24 g. at 100% or 17% by weight in proportion to the monomer) are introduced in eight hours.

At the end of this reaction time the polymer is drained, washed, and dried. 110 g. (representing a 78.5% yield) of a white powder results. This will not fuse at 200° C.

It should also be noted that the monomer is soluble in a mixture of ether and chloroform, whereas the polymer is insoluble in this same mixture.

Testing has shown that the proportion of anhydride is 99%.

The specific viscosity of a 1% solution of this product in dimethylformamide at 25° C. is 0.06.

EXAMPLE 62

Preparation of poly(acrylic anhydride) having recurring units of the formula:

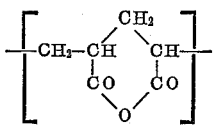

200 ml. of toluene and 5 g. of lauryl mercaptan are placed in a flask provided with agitating means, cooling means, a thermometer, a dropping funnel and a tube for introducing nitrogen.

This is brought to reflux and 14.5 g. of 85% benzoyl peroxide (i.e. 12.3 g. at 100% or 12.3% by weight in proportion to the monomer), dissolved in 150 ml. of toluene, are added.

While keeping the mixture at reflux, 100 g. of freshly distilled acrylic anhydride are rapidly introduced. Polymerization is practically instantaneous. The mixture is heated for an additional 15 minutes, cooled, and after drying, washed first with benzene and then with petroleum ether.

The result is 100 g. (a 100% yield) of a bulky electrostatic white powder.

Testing indicates that the proportion of anhydride is 100%.

The specific viscosity of a 1% solution of the polymer in 2 N sodium hydroxide at 25° C. is 0.15.

EXAMPLE 63

Preparation of a poly(mixed acrylic-methacrylic anhydride) having recurring units of the formula:

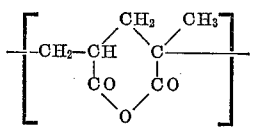

The procedure is the same as in Example 62, except that the process starts with a mixed acrylic-methacrylic anhydride monomer which has been freshly distilled instead of with the acrylic anhydride monomer.

The result is 89 g. (an 89% yield) of a bulky electrostatic white powder.

Testing indicates that the proportion of anhydride is 100%.

The specific viscosity of a 1% solution of the polymer in 2 N sodium hydroxide at 25° C. is 0.14.

EXAMPLE 64

Preparation of poly(methacrylic anhydride) having recurring units of the formula:

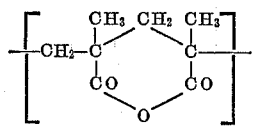

The procedure is the same as in Example 62, except that the acrylic anhydride is replaced by methacrylic anhydride.

The result is 55 g. (a 55% yield) or a more dense and less electrostatic white powder.

Testing shows that the proportion of anhydride is 100%.

The specific viscosity of a 1% solution of the polymer in 2 N sodium hydroxide at 25° C. is 0.11.

EXAMPLE 65

Preparation of a polysulfhydryl polymer having recurring units of the formula:

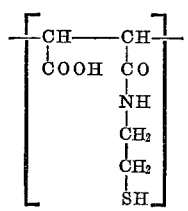

by condensation of β-mercaptoethylamine on poly(maleic anhydride).

The starting material is poly(maleic anhydride) prepared as described in Example 60.

In order to condense the β-mercaptoethylamine, 126 g. (1 mol) of 90% β-mercaptoethylamine hydrochloride and 25 ml. of water are placed in a flask provided with agitating means, a thermometer, a dropping funnel, and a tube for introducing nitrogen.

40 g. (1 mol) of sodium hydroxide tablets are added while cooling, so as to liberate the amine from its hydrochloride. While agitating and cooling, 49 g. (0.5 mol) of poly(maleic anhydride) are added, and then 20 g. (0.5 mol) of sodium hydroxide tablets to liberate the amine function salifying the carboxyl of the polymer.

49 g. (0.5 mol) of the polymer and 20 g. (0.5 mol) of NaOH tablets are then added simultaneously.

When the reaction has been completed, the product is acidified with concentrated hydrochloric acid.

The precipitate is washed with water and then vacuum dried.

The result is 133 g. (a 76% yield by weight) of the polysulfhydryl polymer according to the invention.

This polymer, which after drying takes the form of a powder which is soluble in water at an alkaline pH, analyzes as follows:

SH percent calculated: 18.85. SH percent found: 10.3.

After reduction of the oxidized portion of the product, re-analysis yields the following result:

SH percent calculated: 18.85. SH percent found: 12.94.

EXAMPLE 66

A polysulfhydryl polymer, according to the invention, has recurring units having the formula:

$$\left[\begin{array}{c}-CH-CH-\\ |\quad\quad|\\ COOH\ CO\\ |\\ NH\\ |\\ CH_2\\ |\\ CH_2\\ |\\ NH\\ |\\ CO\\ |\\ CH_2\\ |\\ SH\end{array}\right]$$

is prepared by condensing N(β-aminoethyl) thioglycolamide on poly(maleic anhydride).

The procedure is the same as that in Example 65, except that the β-mercaptoethylamine is replaced by a molecularly equivalent quantity of N(β-aminoethyl)thioglycolamide.

The result is a yield of 75% by weight (169 g.) of a powder which is soluble in water at an alkaline pH. Analysis of this powder yields the following result:

SH percent calculated: 14.2. SH percent found: 10.4.

EXAMPLE 67

A partial sulfhydryl polymer having recurring units of the formula:

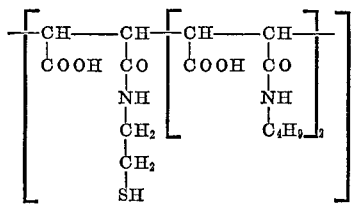

The procedure is the same as that described in Example 66, except that ⅓ β-mercaptoethylamine and ⅔ butylamine replace a molecularly equivalent quantity of N-(β-aminoethyl)thioglycolamide.

The result is 133 grams, representing a yield of 70% by weight, of a powder which is soluble in water at an alkaline pH, and which analyzes as follows:

SH percent calculated: 5.75. SH percent found: 3.15.

After reduction of the oxidized form of the product, the result is as follows:

SH percent calculated: 5.75. SH percent found: 3.9.

EXAMPLE 68

A partial polysulfhydryl polymer having recurring units of the formula:

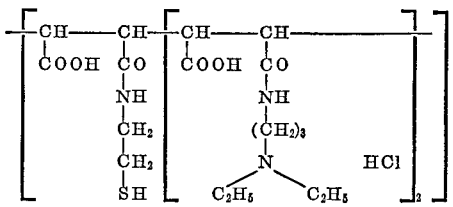

The method of operation is the same as described in Example 67, except that the N-butylamine is replaced by a molecular equivalent quantity of N,N-diethylpropylenediamine.

There is thus obtained a yield of 57% by weight (133 g.) of a powder which is soluble in water at an alkaline or neutral pH.

This water-soluble polymer has not been washed and consequently contains sodium chloride.

Analysis yields the following results:

SH percent calculated: 4.7. SH percent found: 2.4.

After reduction of the oxidized form of the product the analysis is:

SH percent calculated: 4.7. SH percent found: 4.3.

EXAMPLE 69

A partial polysulfhydryl polymer having recurring units of the formula:

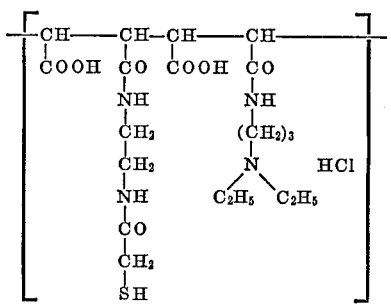

is prepared by condensing N(β-aminoethyl)thioglycolamide and N,N-diethylaminopropylamine on poly(maleic anhydride) in the following manner:

67 g. (0.5 mol) of N(β-aminoethyl)-thioglycolamide, 65 g. (0.5 mol) of N,N-diethylaminopropylamine, and 600 ml. of water are placed in a flask provided with agitating means, cooling means, a thermometer, a dropping funnel and a tube for introducing nitrogen.

49 g. (0.5 mol) of poly(maleic anhydride) are added while agitating and cooling the mixture. 20 g. (0.5 mol) of sodium hydroxide tablets are then added to liberate the amine function by salifying the carboxyl of the polymer.

49 g. (0.5 mol) of polymer and 20 g. (0.5 mol) of sodium hydroxide tablets are then added.

At the end of the reaction, the product is acidified with concentrated hydrochloric acid.

The result is a yield of 99 g. (40% by weight) of the polymer according to the invention.

This product is in the form of a powder which is soluble in water at neutral and alkaline pH values.

This water-soluble powder has not been washed and therefore contains sodium chloride.

Analysis yields the following results:

SH percent calculated: 6.65. SH percent found: 3.45.

After reduction of the oxidized form of the product the analysis is:

SH percent calculated: 6.65. SH percent found: 4.66.

EXAMPLE 70

A partial sulfhydryl polymer having recurring units of the formula:

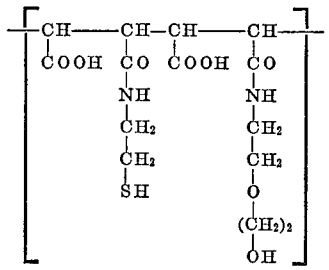

The method is the same as that described in Example 69 except that the N(β-aminoethyl)-thioglycolamide is replaced by β-mercaptoethylamine and the N,N-diethylaminopropylamine by diglycolamine in molecularly equivalent quantities.

The yield is 100 g. (55% by weight) of a powder which is soluble in water under alkaline conditions.

The following analysis has been made:

SH percent calculated: 8.75. SH percent found: 4.5.

After reduction of the oxidized form of the product the analysis is:

SH percent calculated: 8.75. SH percent found: 6.4.

EXAMPLE 71

A polysulfhydryl polymer having recurring units of the formula:

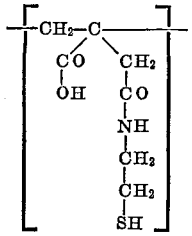

is prepared by condensing β-mercaptoethylamine on poly(itaconic anhydride) prepared as in Example 61. The procedure is the same as in Example 65, except that the poly(maleic anhydride) is replaced by poly(itaconic anhydride).

The result is 156 g. (a yield of 83% by weight) of a powder which is soluble in water at an alkaline pH and which analyzes as follows:

SH percent calculated: 17.45. SH percent found: 12.4.

After reduction of the oxidized form of the product the result is:

SH percent calculated: 17.45. SH percent found: 17.08.

EXAMPLE 72

A polysulfhydryl polymer having recurring units of the formula:

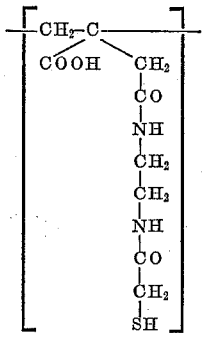

is prepared by condensing N(β-aminoethyl)thioglycolamide on poly(itaconic anhydride).

The procedure is the same as described in Example 66, except that the poly(maleic anhydride) is replaced by poly(itaconic anhydride).

The result is 141 g. (a yield of 58% by weight) of a powder which is soluble in water under alkaline conditions, and which analyzes as follows:
SH percent calculated: 13.4. SH percent found: 8.75.
After reduction of the oxidized form of the product the analysis becomes:
SH percent calculated: 13.4. SH percent found: 11.7.

EXAMPLE 73

A partial polysulfhydryl polymer having recurring units of the formula:

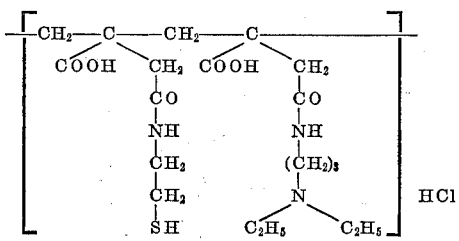

is prepared.

The procedure is the same as described in Example 69 except that the poly(maleic anhydride) is replaced by poly(itaconic anhydride) and the N(β-aminoethyl)-thioglycolamide by β-mercaptoethylamine.

The result is 160 g. (a yeild of 69% by weight) of a powder which is soluble in water under neutral and basic conditions.

This water-soluble polymer has not been washed and therefore contains sodium chloride.

Analysis yields the following results:
SH percent calculated: 7.05. SH percent found: 5.7.
After reduction of the oxidized form of the product, this becomes:
SH percent calculated: 7.05. SH percent found: 6.1.

EXAMPLE 74

A polysulfhydryl polymer having recurring units of the following formula is prepared:

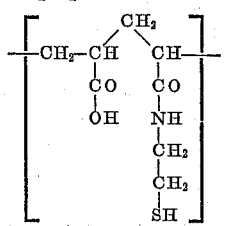

The procedure is the same as described in Example 65, except that the poly(maleic anhydride) is replaced by poly(acrylic anhydride) described in Example 62.

The result is 177 g. (a yield of 85% by weight) of a white powder which is soluble in water at an alkaline pH, and which analyzes as follows:
SH percent calculated: 16.25. SH percent found: 13.1.
After reduction of the oxidized form of the product, the analysis becomes:
SH percent calculated: 16.25. SH percent found: 14.5.

EXAMPLE 75

A polysulfhydryl polymer having recurring units of the following formula is prepared:

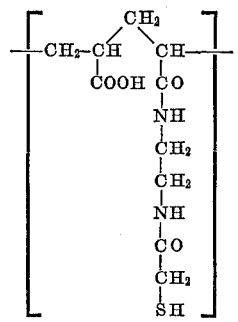

The procedure is the same as described in Example 65, except that the poly(maleic anhydride) is replaced by poly(acrylic anhydride) and the β-mercaptoethylamine by N(β-aminoethyl)-thioglycolamide.

The result is 163 g. (a yield of 63% by weight) of a white powder which is soluble in water under alkaline conditions and which analyzes as follows:
SH percent calculated: 12.7. SH percent found: 7.86.
After reduction of the oxidized form of the product, the analysis becomes:
SH percent calculated: 12.7. SH percent found: 10.0.

EXAMPLE 76

A polysulfhydryl copolymer having recurring units of the following formula is prepared:

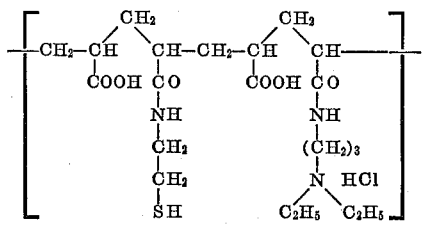

The procedure is the same as described in Example 69, except that the poly(maleic anhydride) is replaced by poly(acrylic anhydride) and the N(β-aminoethyl)-thioglycolamide by β-mercaptoethylamine.

The result is 164 g. (a yield of 67% by weight) of a white powder which is soluble in water at alkaline and neutral pH values.

This water-soluble polymer has not been washed and consequently contains sodium chloride.

Analysis yields the following results:
SH percent calculated: 6.66. SH percent found: 5.9.
After reduction of the oxidized form of the product, the analysis becomes:
SH percent calculated: 6.66. SH percent found: 6.5.

EXAMPLE 77

A polysulfhydryl polymer having recurring units of the following formula is prepared:

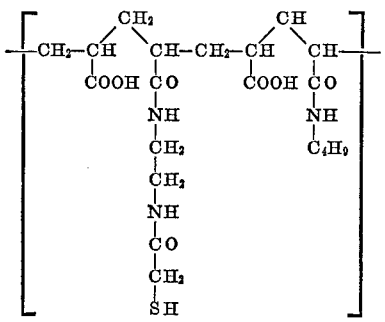

The procedure is the same as in Example 69, except that the poly(maleic anhydride) is replaced by poly-(acrylic anhydride) and the N,N-diethylaminopropyl-amine by N-butylamine.

The result is 188 g. (a yield of 82% by weight) of a white powder which is soluble in water under alkaline conditions.

This powder analyzes as follows:
SH percent calculated: 7.2. SH percent found: 4.46.
After reduction of the oxidized form of the product, the analysis becomes:
SH percent calculated: 7.2. SH percent found: 6.54.

EXAMPLE 78

A polysulfhydryl polymer having recurring units of the following formula is prepared:

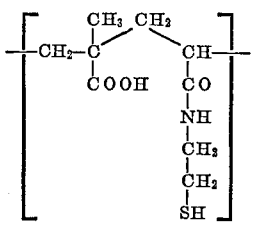

The procedure is the same as described in Example 65, except that the poly(maleic anhydride) is replaced by poly(mixed acrylic-methacrylic anhydride) described in Example 63.

The result is 190 g. (a yield of 87.5 by weight) of a white powder which is soluble in water under alkaline conditions and which analyzes as follows:
SH percent calculated: 15.2. SH percent found: 9.04.
After reduction of the oxidized form of the product, the analysis becomes:
SH percent calculated: 15.2. SH percent found: 15.2.

EXAMPLE 79

A polysulfhydryl polymer having recurring units of the following formula is prepared:

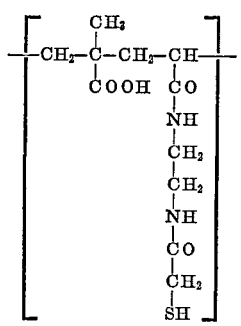

The procedure is the same as described in Example 65, except that the poly(maleic anhydride) is replaced by poly(mixed acrylic-methacrylic anhydride) and the β-mercaptoethylamine by N(β-aminoethyl)thioglycolamide.

The result is a yield of 75% by weight of a white powder which is soluble in water under alkaline conditions, and which analyzes, as follows:
SH percent calculated: 12.05. SH percent found: 8.5.
After reduction of the oxidized form of the product, the analysis becomes:
SH percent calculated: 12.05. SH percent found: 9.2.

EXAMPLE 80

A polysulfhydryl polymer having recurring units of the following formula is prepared:

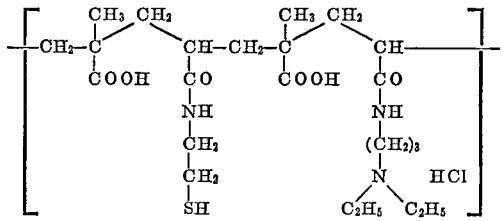

The procedure is the same as in Example 69, except that the poly(maleic anhydride) is replaced by a poly-(mixed acrylic-methacrylic anhydride) and the N(β-aminoethyl)thioglycolamide by β-mercaptoethylamine.

The product is 198 g. (a yield of 76% by weight) of a white powder which is soluble in water at neutral and alkaline pH values.

This polymer contains sodium chloride.
Analysis of this powder yields the following results:
SH percent calculated: 6.3. SH percent found: 4.35.
After reduction of the oxidized form of the product, the analysis becomes:
SH percent calculated: 6.3. SH percent found: 5.6.

EXAMPLE 81

A polysulfhydryl polymer having recurring units of the following formula is prepared:

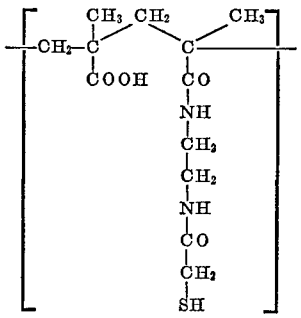

The procedure is the same as described in Example 65, except that the poly(maleic anhydride) is replaced by poly(methacrylic anhydride) and the β-mercaptoethylamine by N-(β-aminoethyl)-thioglycolamide.

The product is 260 g. (a yield of 90% by weight) of a white powder which is soluble in water under alkaline or neutral conditions, and which analyzes as follows:
SH percent calculated: 11.45. SH percent found: 8.3.
After reduction of the oxidized form of the product the analysis becomes:
SH percent calculated: 11.45. SH percent found: 9.3.

EXAMPLE 82

A hair setting lotion having the following composition:

G.
Product formed by condensing ⅓ mercaptoethyl-amine and ⅔ diethylamino-propylamine on poly-(maleic anhydride), as in Example 68 _____ 3
Aminoethylpropanediol, q.s.p. pH=7.
Ethyl alcohol, q.s.p. 25°.
Perfume _____ 0.2
Water, 100 cc.

is prepared by first dissolving the resin in the water in the presence of aminoethylpropanediol. Ethyl alcohol and perfume are then added; the pH is adjusted with the above base, and the product completed by adding the quantity of water indicated.

In order to set the hair, 20 cm.³ of this lotion are applied to hair which has been washed and dried.

The hair is combed to distribute the lotion well, the hair is curled up on rollers, and dried.

After unrolling the hair, it is brushed out, and a set of excellent quality is obtained.

EXAMPLE 83

In the same manner as described in the foregoing example, a lotion having the following composition is prepared:

G.
Product resulting from the condensation of ⅓ mercaptoethylamine and ⅔ diethylaminopropylamine, on poly(maleic anhydride), as in Example 68 ____ 3.5
Aminoethylpropanol, q.s.p. pH=7.
Ethyl alcohol, q.s.p. 50°.
Water, q.s.p. 100 cc.

65 g. of the above solution are placed in an aerosol bomb containing 4 g. of butane to act as a propellant.

This lotion is then applied to the hair in the same way as in the preceding example, and the aerosol spray makes it easier to distribute the product evenly over the hair.

EXAMPLE 84

In the manner hereinbefore described, a setting lotion having the following composition is prepared:

G.
Product of the condensation of ½ mercaptoethylamine and ½ diglycolamine on poly(maleic anhydride) according to Example 70 _____ 3
Diglycolamine, q.s.p. pH=7.
Ethyl alcohol, q.s.p. 25°.
Perfume _____ 0.2
Water, q.s.p. 100 cc.

The application of this lotion also results in a set of excellent quality.

EXAMPLE 85

In order to produce an aerosol foam for use as a setting lotion, a composition having the following formula is prepared:

G.
Production of the condensation of ½ mercaptoethylamine and ½ diglycolamine on poly(maleic anhydride) in accordance with Example 70 _____ 4
Diglycolamine, q.s.p. pH=7.
40% oxyethylenated sodium lauryl sulfate _____ 1
Perfume _____ 0.2
Water, q.s.p. 100 cc.

The first step is to solubilize the resin in water and in the presence of diglycolamine. An emulsifier which has first been dissolved in water is then incorporated into the lotion. The pH is adjusted to 7, using the same base, perfume is added, and the process is completed by adding sufficient distilled water to bring the total volume up to 100 cc.

60 g. of this solution are mixed in an aerosol bomb with 5 g. of a propellant, e.g., the fluorinated hydrocarbon, dichlorodifluoromethane, sold under the trademark "Freon 12."

This aerosol bomb delivers a creamy foam which, when applied to hair which has been washed and dried, makes it much easier to comb and roll up on setting rollers.

The results are very satisfactory.

EXAMPLE 86

In order to produce a hair setting lotion the following composition is prepared and applied as in Example 83:

G.
Product of the condensation of ⅓ mercaptoethylamine and ⅔ butylamine on poly(maleic anhydride), as per Example 67 _____ 3
Aminoethylpropanol, q.s.p. pH=8.
Ethyl alcohol, q.s.p. 20°.
Perfume _____ 0.2
Water, q.s.p. 100 cc.

Equally good results are obtained.

The following solutions may be used to impregnate keratinic textile fibres, as has been indicated in the foregoing examples.

Solution A:
Polysulfhydrylated polymer obtained as indicated in Example 68 _____g__ 3
Ammonia solution at 22° Bé. _____cc__ 4.5
Water, q.s.p. 100 cc.

Solution B:
Polysulfhydrylated polymer as indicated in Example 73 _____g__ 1.1
Ammonia solution at 22° Bé. _____cc__ 2
Water, q.s.p. 100 cc.

Solution C:
Polysulfhydrylated polymer obtained as indicated in Example 65 _____g__ 0.3
Ammonia solution at 22° Bé. _____cc__ 0.6
Water, q.s.p. 100 cc.

Solution D:
Polysulfhydrylated polymer obtained as indicated in Example 76 _____g__ 1.1
Ammonia solution at 22° Bé. _____cc__ 2
Water, q.s.p. 100 cc.

What is claimed is:

1. A process for treating human hair comprising impregnating said hair with an effective amount of a solution of a solid polysulfhydrylated polymer and a solvent therefor, said solvent being selected from the group consisting of water, alcohol and their mixtures and said polymer having recurring units of the formula

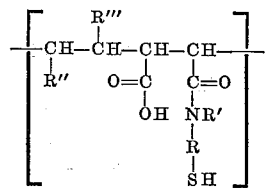

wherein R″ is selected from the group consisting of hydrogen and phenyl, R‴ is hydrogen, R is selected from the group consisting of alkylene having 2–4 carbon atoms and alkylene having 2–4 carbon atoms substituted with carboxy and R′ is selected from the group consisting of hydrogen, methyl and ethyl, said solution containing 1–20 percent by weight of said polymer and having a pH ranging from 4.5–10, and shaping said impregnated hair in the desired configuration.

2. A process for treating human hair comprising impregnating said hair with an effective amount of a solution of a solid polysulfhydrylated polymer and a solvent therefor, said solvent being selected from the group consisting of water, alcohol and their mixtures and said polymer having recurring units of the formula

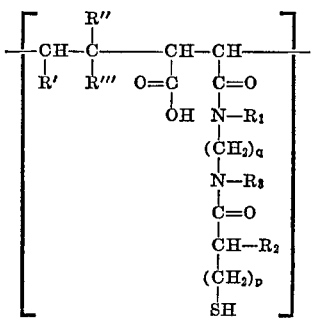

wherein $R_1$ is selected from the group consisting of hydrogen, methyl, ethyl and —$CH_2$—$CH_2$—OH, $R_2$ is selected from the group consisting of hydrogen and methyl, $R_3$ is hydrogen, $q$ is 2–6 inclusive, $p$ is 0 or 1, R' and R" are selected from the group consisting of hydrogen, lower alkyl having 1–4 carbon atoms and phenyl and R''' is selected from the group consisting of hydrogen,

said solution containing 1–20 percent by weight of said polymer and having a pH ranging from 4.5–10, and shaping said impregnated hair in the desired configuration.

3. A process for treating human hair comprising impregnating said hair with an effective amount of a solution of a solid polysulfhydrylated polymer and a solvent therefor, said solvent being selected from the group consisting of water, alcohol and their mixtures and said polymer having recurring units of the formula

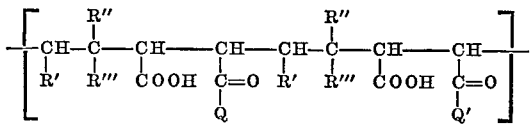

wherein R' and R" are selected from the group consisting of hydrogen, lower alkyl having 1–4 carbon atoms and phenyl, R''' is selected from the group consisting of hydrogen,

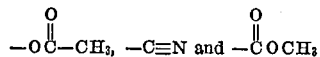

Q has the formula

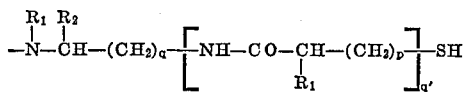

wherein $R_1$ is hydrogen, $R_2$ is selected from the group consisting of hydrogen and —COOH, $q$ is 1–5 inclusive, $q'$ is equal to 0 or 1 and $p$ is equal to 0 or 1, and Q' has the formula

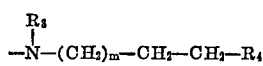

wherein $R_3$ is hydrogen, $R_4$ is selected from the group consisting of lower alkyl having 1–4 carbon atoms and

wherein $r$ and $r'$ are selected from the group consisting of lower alkyl having 1–4 carbon atoms and together with the nitrogen atom to which they are attached form a morpholinyl ring and $m$ is 0–4, said solution containing 1–20 percent by weight of said polymer and having a pH ranging from 4.5–10, and shaping said impregnated hair in the desired configuration.

4. A process for treating human hair comprising impregnating said hair with an effective amount of a solution of a solid polysulfhydrylated polymer and a solvent therefor, said solvent being selected from the group consisting of water, alcohol and their mixtures and said polymer having recurring units of the formula

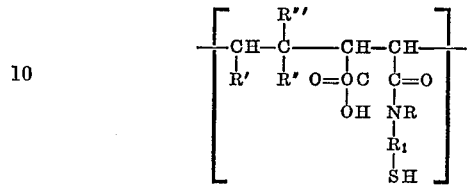

wherein $R_1$ is selected from the group consisting of alkylene having 2–4 carbon atoms and alkylene having 2–4 carbon atoms substituted with carboxy, R is selected from the group consisting of hydrogen, methyl and ethyl, R' and R" are selected from the group consisting of hydrogen, lower alkyl having 1–4 carbon atoms and phenyl and R''' is selected from the group consisting of hydrogen,

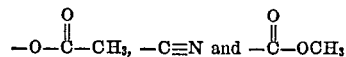

said solution containing 1–20 percent by weight of said polymer and having a pH ranging from 4.5–10 and shaping said impregnated hair in the desired configuration.

5. A composition for treating human hair comprising a solution of a solid polysulfhydrylated polymer and a solvent therefor, said solvent being selected from the group consisting of water, alcohol and their mixtures, said polymer having recurring units of the formula

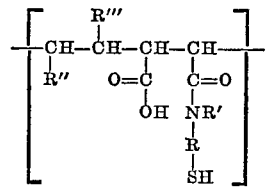

wherein R" is selected from the group consisting of hydrogen and phenyl, R''' is hydrogen, R is selected from the group consisting of alkylene having 2–4 carbon atoms and alkylene having 2–4 carbon atoms substituted with carboxy and R' is selected from the group consisting of hydrogen, methyl and ethyl, said solution containing 1–20 percent by weight of said polymer and having a pH ranging from 4.5–10.

6. A composition for treating human hair comprising a solution of a solid polysulfhydrylated polymer and a solvent therefor, said solvent being selected from the group consisting of water, alcohol and their mixtures and said polymer having recurring units of the formula

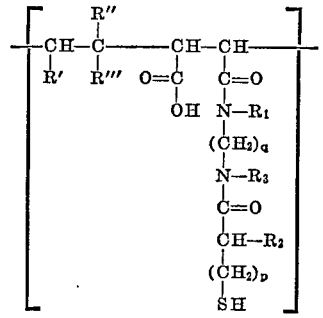

wherein $R_1$ is selected from the group consisting of hydrogen, methyl, ethyl and —$CH_2$—$CH_2$—OH, $R_2$ is selected from the group consisting of hydrogen and methyl, $R_3$ is hydrogen, $q$ is 2–6 inclusive, $p$ is 0 or 1, R' and R" are selected from the group consisting of hydrogen, lower alkyl having 1-4 carbon atoms and phenyl and R''' is selected from the group consisting of hydrogen,

said solution containing 1-20 percent by weight of said polymer and having a pH ranging from 4.5-10.

7. A composition for treating human hair comprising a solution of a solid polysulfhydrylated polymer and a solvent therefor, said solvent being selected from the group consisting of water, alcohol and their mixtures and said polymer having recurring units of the formula

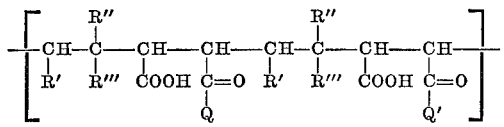

wherein R' and R'' are selected from the group consisting of hydrogen, lower alkyl having 1-4 carbon atoms and phenyl, R''' is selected from the group consisting of hydrogen,

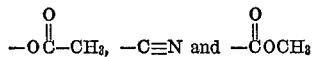

Q has the formula

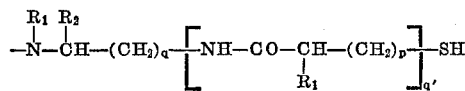

wherein $R_1$ is hydrogen, $R_2$ is selected from the group consisting of hydrogen and —COOH, $q$ is 1-5 inclusive, $q'$ is equal to 0 or 1 and $p$ is equal to 0 or 1, and Q' has the formula

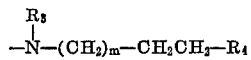

wherein $R_3$ is hydrogen, $R_4$ is selected from the group consisting of lower alkyl having 1-4 carbon atoms and

wherein $r$ and $r'$ are selected from the group consisting of lower alkyl having 1-4 carbon atoms and together with the nitrogen atom to which they are attached form a morpholinyl ring and $m$ is 0-4, said solution containing 1-20 percent by weight of said polymer and having a pH ranging from 4.5-10.

8. A composition for treating human hair comprising a solution of a solid polysulfhydrylated polymer and a solvent therefor, said solvent being selected from the group consisting of water, alcohol and their mixtures and said polymer having recurring units of the formula

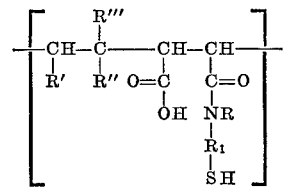

wherein $R_1$ is selected from the group consisting of alkylene having 2-4 carbon atoms and alkylene having 2-4 carbon atoms substituted with carboxy, R is selected from the group consisting of hydrogen, methyl and ethyl, R' and R'' are selected from the group consisting of hydrogen, lower alkyl having 1-4 carbon atoms and phenyl and R''' is selected from the group consisting of hydrogen, $$-O-\overset{O}{\underset{\|}{C}}-CH_3, \quad -C\equiv N \text{ and } -\overset{O}{\underset{\|}{C}}-OCH_3$$

said solution containing 1-20 percent by weight of said polymer and having a pH ranging from 4.5-10.

References Cited

UNITED STATES PATENTS

| | | | |
|---|---|---|---|
| 2,466,963 | 4/1949 | Patrick et al. | 260—79.1 |
| 2,944,942 | 7/1960 | Charle et al | 424—72 |
| 3,247,067 | 4/1966 | Miskel et al. | 424—71 |

ALBERT T. MEYERS, Primary Examiner

V. C. CLARKE, Assistant Examiner

U.S. Cl. X.R.

8—127.6, 128 A; 260—78 SC, 78.5 N, 78.5 T; 424—49, 71, 72, DIG. 1 & 2

UNITED STATES PATENT OFFICE
CERTIFICATE OF CORRECTION

Patent No. 3,741,723      Dated June 26, 1973

Inventor(s) Gregoire KALOPISSIS

It is certified that error appears in the above-identified patent and that said Letters Patent are hereby corrected as shown below:

In the Heading, please insert

--- Claims priority, applications France No. 892,586, March 28, 1962; No. 978,830, June 19, 1964; No. 2338, January 18, 1965; No. 978,832, June 19, 1964; No. 2339, January 18, 1965; No. 2337, January 18, 1965 and No. 27374, August 5, 1965. ---

Signed and sealed this 18th day of December 1973.

(SEAL)
Attest:

EDWARD M. FLETCHER, JR.
Attesting Officer

RENE D. TEGTMEYER
Acting Commissioner of Patents